(12) United States Patent
Carnevali

(10) Patent No.: US 8,091,850 B2
(45) Date of Patent: *Jan. 10, 2012

(54) QUICK RELEASE ELECTRONICS PLATFORM

(76) Inventor: Jeffrey D. Carnevali, Seattle, WA (US)

( * ) Notice: Subject to any disclaimer, the term of this patent is extended or adjusted under 35 U.S.C. 154(b) by 259 days.

This patent is subject to a terminal disclaimer.

(21) Appl. No.: 12/386,479

(22) Filed: Apr. 17, 2009

(65) Prior Publication Data

US 2009/0212189 A1    Aug. 27, 2009

Related U.S. Application Data

(63) Continuation-in-part of application No. 11/809,283, filed on May 31, 2007, now Pat. No. 7,823,844.

(51) Int. Cl.
*A47B 91/00* (2006.01)

(52) U.S. Cl. ............. 248/346.04; 248/176.1; 248/316.4; 248/346.01

(58) Field of Classification Search ............... 248/176.1, 248/316.4, 346.04, 309.1, 918, 346.07, 346.01; 361/807

See application file for complete search history.

(56) References Cited

U.S. PATENT DOCUMENTS

| | | | |
|---|---|---|---|
| 1,670,970 A | 5/1928 | Leverdiere | |
| 1,684,925 A | 9/1928 | Perlmutter | |
| 2,319,377 A | 5/1943 | Wallace et al. | |
| 2,653,330 A | 9/1953 | Nolan | |
| 2,733,492 A | 2/1956 | Copell | |
| 3,509,882 A | 5/1970 | Blake | |
| 3,581,424 A | 6/1971 | Bloom | |
| 3,669,392 A | 6/1972 | Saunders | |
| 4,066,231 A | 1/1978 | Bahner et al. | |
| 4,118,003 A | 10/1978 | Dillow | |
| 4,798,294 A | 1/1989 | Bodi | |
| 4,802,708 A | 2/1989 | Vos et al. | |
| 4,803,759 A | 2/1989 | Kemble | |
| 4,844,387 A | 7/1989 | Sorgi et al. | |
| 4,909,159 A | 3/1990 | Gonsoulin | |
| 4,928,916 A | 5/1990 | Molloy | |
| 4,957,264 A | 9/1990 | Hakanen | |
| 4,976,721 A | 12/1990 | Blasnik et al. | |
| 5,024,408 A | 6/1991 | Magee | |
| 5,149,032 A | 9/1992 | Jones et al. | |
| 5,457,745 A | 10/1995 | Wang | |
| 5,582,377 A | 12/1996 | Quesada | |
| D377,798 S | 2/1997 | Heine | |
| 5,612,509 A | 3/1997 | Market | |
| 5,653,414 A | 8/1997 | Chimel | |
| 5,673,628 A | 10/1997 | Boos | |
| D390,849 S | 2/1998 | Richter et al. | |
| 5,788,202 A | 8/1998 | Richter | |
| 5,793,614 A | 8/1998 | Tollbom | |
| 5,845,885 A | 12/1998 | Carnevali | |
| 5,903,645 A | 5/1999 | Tsay | |
| 5,917,907 A | 6/1999 | Kela | |

(Continued)

*Primary Examiner* — Amy J Sterling

(74) *Attorney, Agent, or Firm* — Charles J. Rupnick Attorney at Law

(57) ABSTRACT

A device mounting platform apparatus having a reconfigurable biasing mechanism. The device mounting platform apparatus includes a frame member capable of being mounted in a vehicle and having a device mounting surface facing generally upward. A clamp member is slidably interconnected to the frame member along a first direction. A biasing mechanism is coupled between the frame and clamp members. The biasing mechanism is reconfigurable for urging a jaw portion of the clamp member along the first direction heading either toward or away from the frame member. The biasing mechanism is thus reconfigurable for either urging the clamp member open or urging it closed.

17 Claims, 11 Drawing Sheets

U.S. PATENT DOCUMENTS

| | | | |
|---|---|---|---|
| 6,032,337 A | 3/2000 | Rankin, Jr. et al. | |
| 6,076,790 A | 6/2000 | Richter | |
| 6,095,470 A | 8/2000 | Kalis | |
| 6,173,933 B1 | 1/2001 | Whiteside et al. | |
| 6,213,438 B1 | 4/2001 | Ostby et al. | |
| 6,229,893 B1 | 5/2001 | Chen | |
| 6,260,866 B1 | 7/2001 | Cheng | |
| 6,286,797 B1 | 9/2001 | Thaxton | |
| 6,370,741 B1 | 4/2002 | Lu | |
| 6,427,959 B1 | 8/2002 | Kalis et al. | |
| 6,585,212 B2 | 7/2003 | Carnevali | |
| 6,600,827 B2 | 7/2003 | Lu | |
| 6,604,472 B2 * | 8/2003 | McNeil | 108/42 |
| 6,647,248 B1 | 11/2003 | Ortscheid et al. | |
| 6,785,567 B2 | 8/2004 | Kato | |
| 6,802,848 B2 | 10/2004 | Anderson et al. | |
| 6,814,377 B2 | 11/2004 | Silverman et al. | |
| 6,817,587 B2 | 11/2004 | Lin | |
| 6,846,196 B1 * | 1/2005 | Fallon | 439/369 |
| 7,017,243 B2 * | 3/2006 | Carnevali | 24/523 |
| 7,032,872 B2 | 4/2006 | Sullivan | |
| 7,523,528 B2 | 4/2009 | Carnevali | |
| 7,551,458 B2 | 6/2009 | Carnevali | |
| 7,823,844 B2 * | 11/2010 | Carnevali | 248/176.1 |
| 2004/0022388 A1 | 2/2004 | Chan et al. | |
| 2006/0026807 A1 * | 2/2006 | Carnevali | 24/523 |
| 2007/0022582 A1 * | 2/2007 | Carnevali | 24/523 |
| 2007/0022583 A1 | 2/2007 | Carnevali | |

* cited by examiner

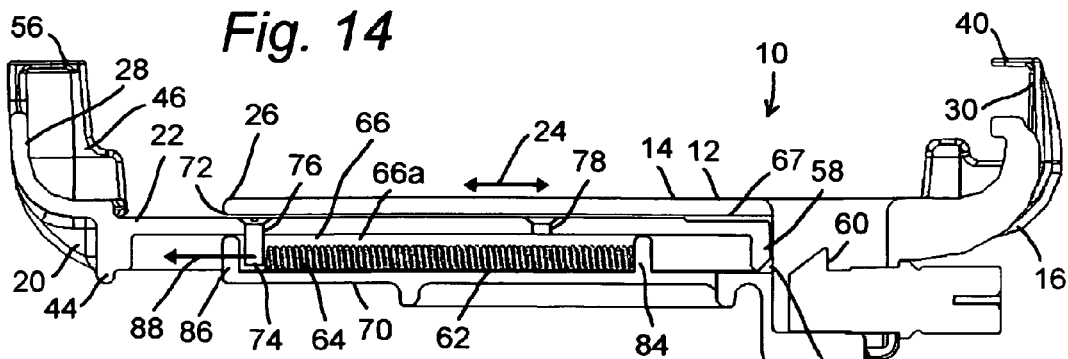
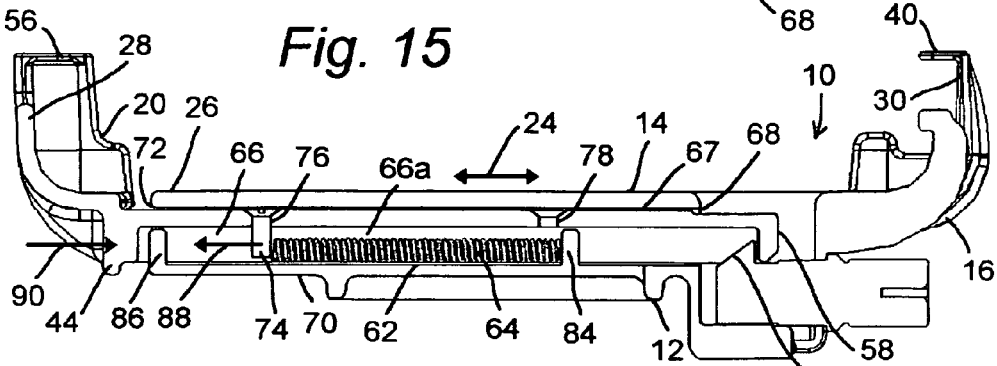
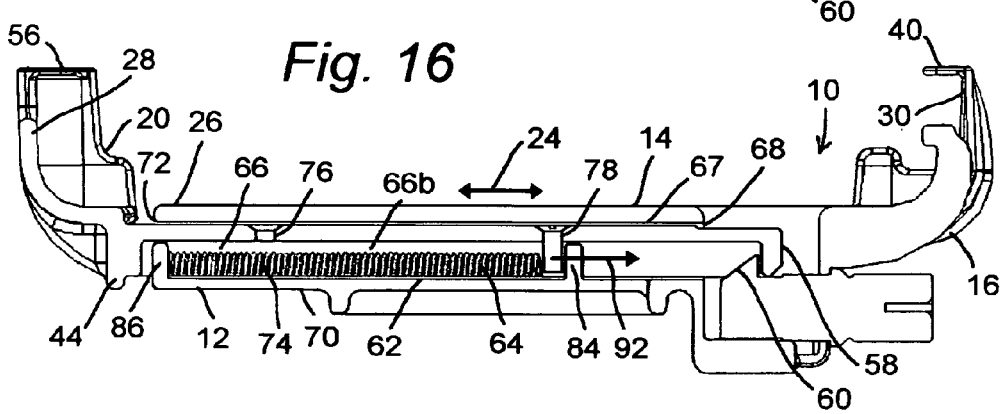
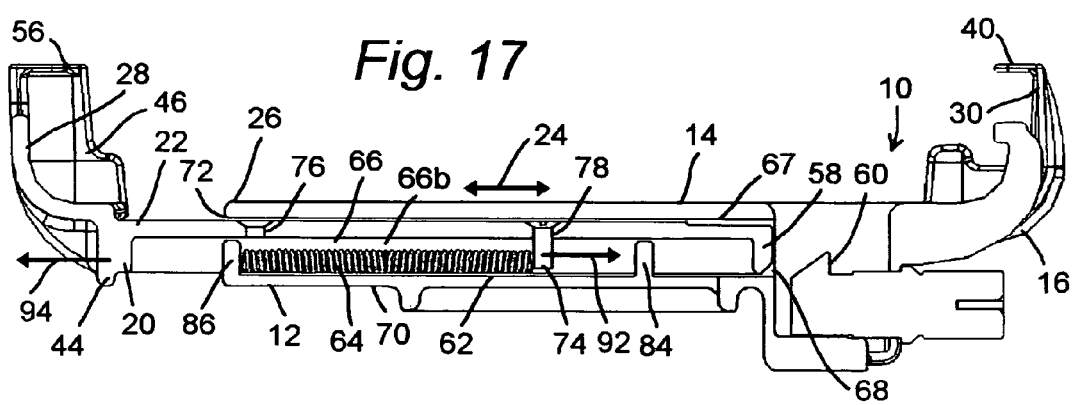

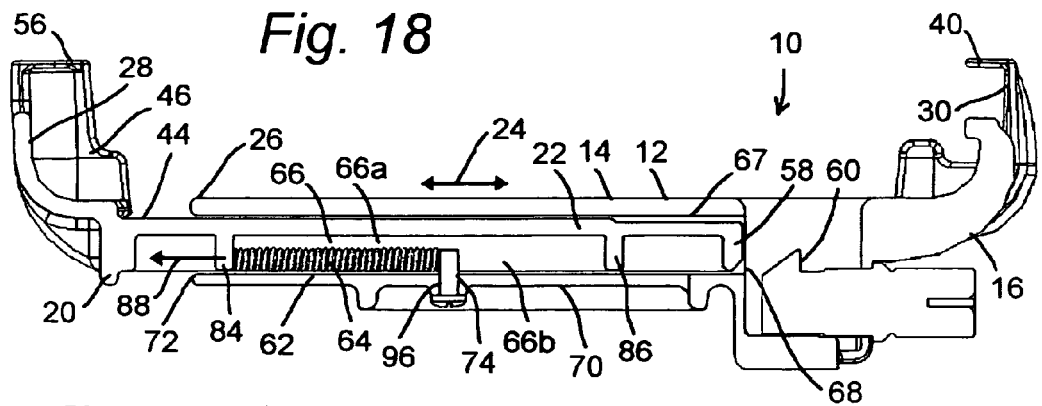
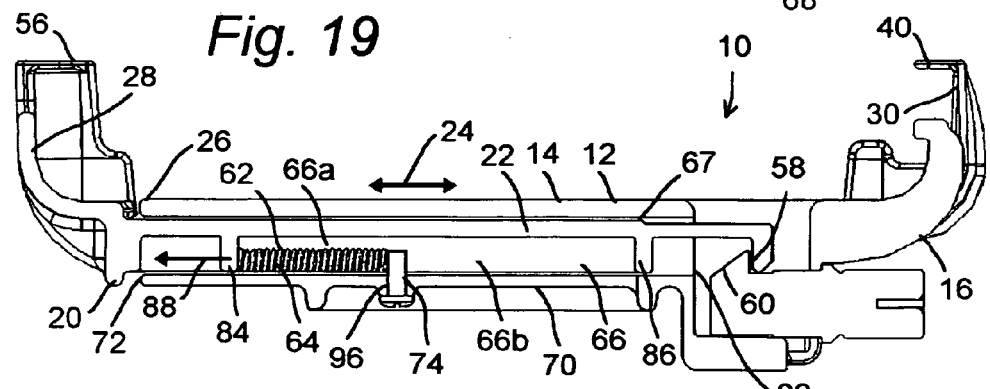
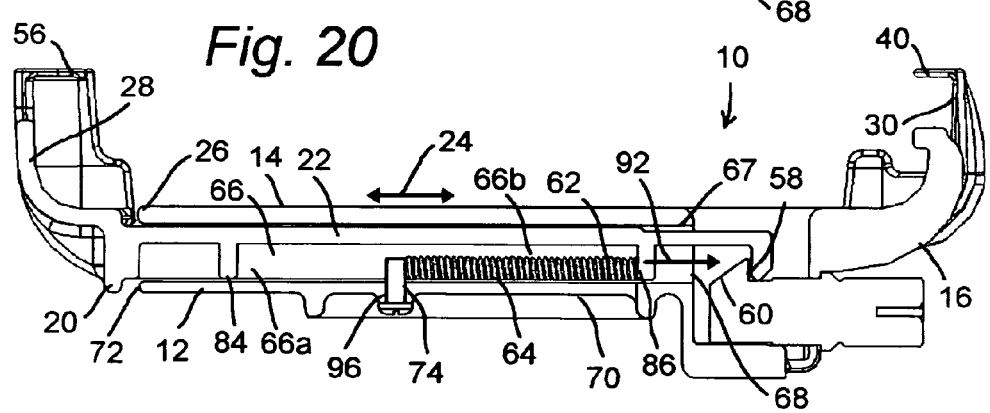
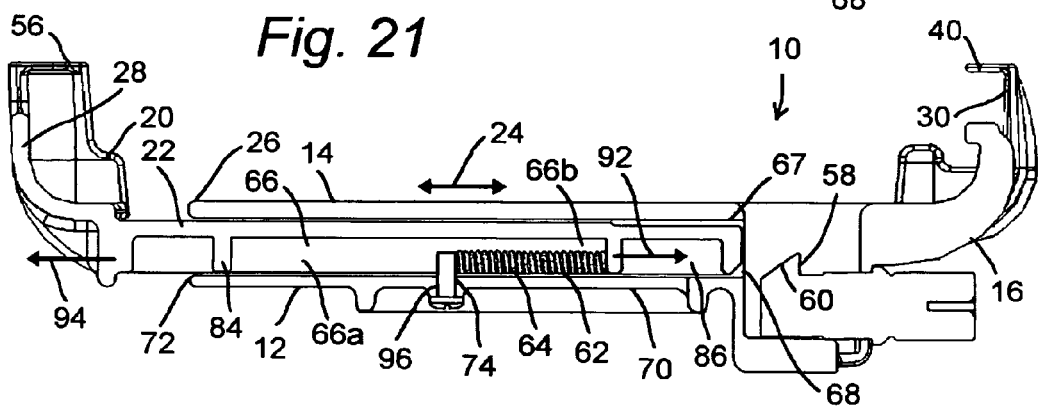

QUICK RELEASE ELECTRONICS PLATFORM

This application is a continuation in part of parent U.S. application Ser. No. 11/809,283 now U.S. Pat. No. 7,823,844, filed in the name of the inventor of the present invention on May 31, 2007, the complete disclosure of which is incorporated herein by reference.

FIELD OF THE INVENTION

The present invention relates generally to trays for holding portable devices, and in particular to quick release trays for holding portable electronic devices, including lap top computers and other similarly sized electronics devices.

BACKGROUND OF THE INVENTION

Many after-market accessories being added in automobiles and other vehicles require specially designed mounting platforms that can accommodate the limited available space normally found in a vehicle for mounting add-on equipment. These mounting platforms must be able to handle the load of the accessory device in the vibration and shock environment encountered in a moving vehicle while still permitting the portable device to be quickly and easily installed in the mounting platform. Some of the currently known mounting platforms are spring biased to open for quick retrieval of the device upon exiting the vehicle. Other known mounting platforms are biased to close quickly after the device is inserted.

However, known mounting platforms apparatus are limited in their ability to provide a full range of device mounting capabilities.

SUMMARY OF THE INVENTION

The present invention is a novel molded laptop tray for vehicle applications having a novel frame member consisting of a molded material. The novel a frame member is molded with a device mounting surface positioned between opposing first and second edges that are spaced apart along a first direction, and is further molded with means for being fixedly mounted in a vehicle with the device mounting surface having a generally upwardly orientation. A jaw portion consisting of a molded material is arranged adjacent to the first edge of the frame member A clamp member is movable relative to the molded frame member along the first direction. Means are provided for moving the clamp member relative to the frame member substantially along the first direction.

According to one aspect of the novel molded laptop tray, the frame member further includes the jaw portion molded as a single unit integral therewith.

According to another aspect of the novel molded laptop tray, the clamp member further includes a resiliently flexible portion thereof that is resiliently flexible substantially along the first direction.

According to another aspect of the novel molded laptop tray, a biasing mechanism is coupled between the frame and clamp members. The biasing mechanism is reconfigurable for urging a jaw portion of the clamp member along the first direction heading either toward or away from the frame member. The biasing mechanism is thus reconfigurable for either urging the clamp member open or urging it closed.

According to another aspect of the novel molded laptop tray, the novel molded laptop tray also includes means for guiding the clamp member relative to the frame member along the first direction thereof; and a means for biasing the clamp member relative to the frame member.

According to another aspect of the novel molded laptop tray, the means for biasing the clamp member further includes means for reconfiguring the biasing means between a first configuration for urging a jaw portion of the clamp member along the first direction away from the second edge of the frame member, and a second configuration for urging a jaw portion of the clamp member along the first direction toward the second edge of the frame member.

According to another aspect of the novel molded laptop tray, the biasing means further comprises a resiliently compressible biasing member; and the reconfigurable biasing mechanism further includes: first and second reaction means operable between the frame and clamp members, the resiliently compressible biasing member being positioned between first and second reaction means, means for actuating the biasing member, the actuating means actuating the biasing member relative to the first reaction means in the first configuration, and the actuating means actuating the biasing member relative to the second reaction means in the second configuration, and means for repositioning the actuating means between a first position between the first and second reaction means in the first configuration, and a different second position between the first and second reaction means in the second configuration.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIGS. 12 and 13 are bottom perspective cross-section views that illustrate by example and without limitation the novel mounting platform apparatus having the novel reconfigurable biasing mechanism configured in the retraction mode, wherein:

FIG. 12 the illustrates the clamp member being forcefully expanded relative to the frame member by an externally applied expansion force, and FIG. 13 illustrates the clamp member being forcefully retracted relative to the frame member by internal expansive biasing forces generated by expansion of one or more biasing members;

FIGS. 14-17 are different cross-section views illustrate by example and without limitation a first alternative embodiment of the novel reconfigurable biasing mechanism, wherein:

FIG. 14 illustrates the alternative novel reconfigurable biasing mechanism configured in an expansion mode for urging a jaw portion of the clamp member away from the frame member and having the jaw portion spaced away from the frame member, FIG. 15 illustrates the alternative novel reconfigurable biasing mechanism configured in the expansion mode for urging a jaw portion of the clamp member away from the frame member and having the jaw portion retracted relative to the frame member and interlocked therewith, FIG. 16 illustrates the alternative novel reconfigurable biasing mechanism configured in a retraction mode for urging a jaw portion of the clamp member toward the frame member and having the jaw portion retracted relative to the frame member and interlocked therewith, and FIG. 17 illustrates the alternative novel reconfigurable biasing mechanism configured in the retraction mode for urging a jaw portion of the clamp member toward the frame member and having the jaw portion expanded away from the frame member; and FIGS. 18-21 are different cross-section views illustrate by example and without limitation a first alternative embodiment of the novel reconfigurable biasing mechanism, wherein:

FIG. 18 illustrates the alternative novel reconfigurable biasing mechanism configured in an expansion mode for urging a jaw portion of the clamp member away from the frame member and having the jaw portion spaced away from the frame member, FIG. 19 illustrates the alternative novel reconfigurable biasing mechanism configured in the expansion mode for urging a jaw portion of the clamp member away from the frame member and having the jaw portion retracted relative to the frame member and interlocked therewith, FIG. 20 illustrates the alternative novel reconfigurable biasing mechanism configured in a retraction mode for urging a jaw portion of the clamp member toward the frame member and having the jaw portion retracted relative to the frame member and interlocked therewith, and FIG. 21 illustrates the alternative novel reconfigurable biasing mechanism configured in the retraction mode for urging a jaw portion of the clamp member toward the frame member and having the jaw portion expanded away from the frame member.

DETAILED DESCRIPTION OF PREFERRED EMBODIMENT

In the Figures, like numerals indicate like elements.

Figure 1:
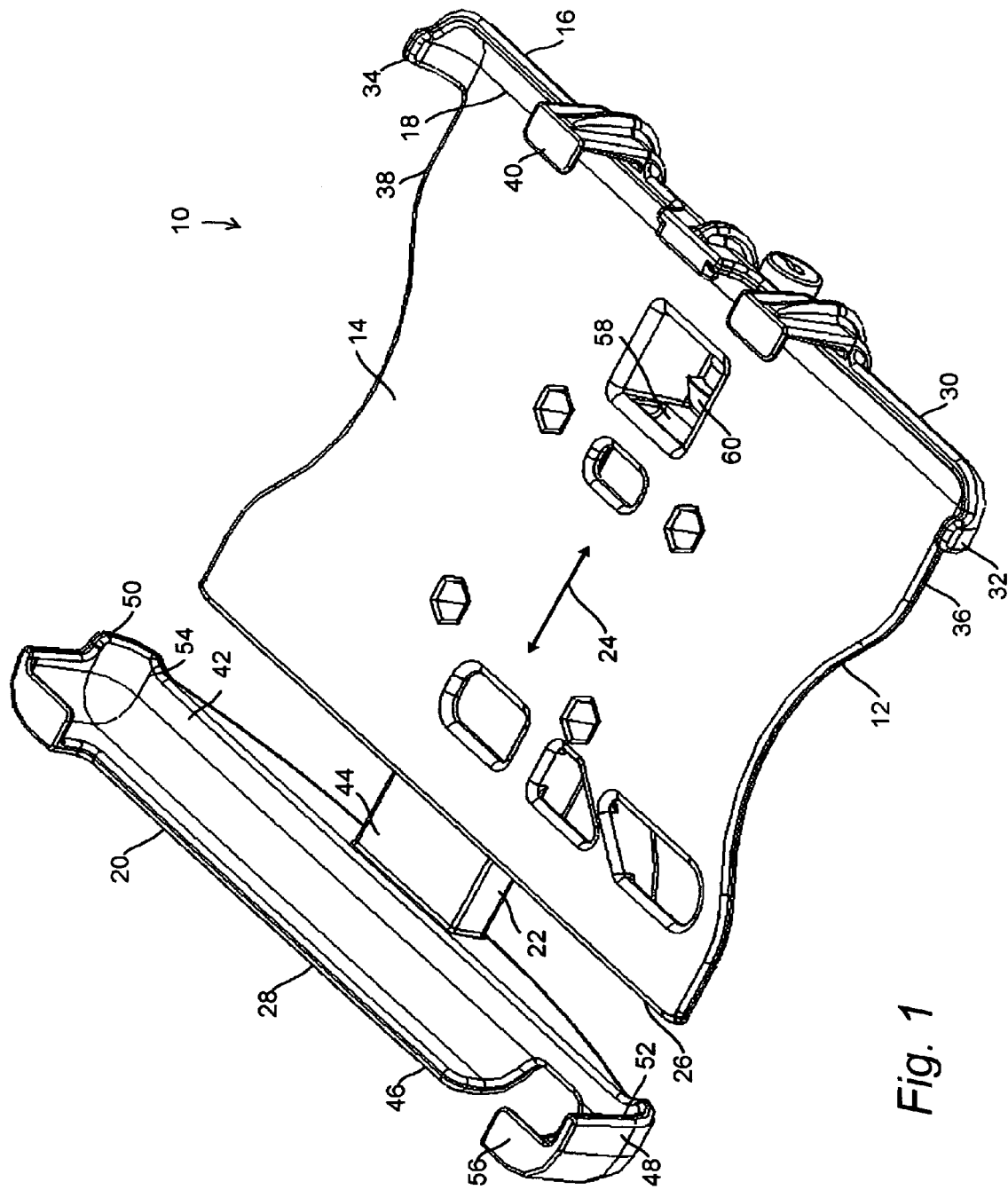
FIG. 1 is a top perspective view showing one example of the novel device mounting platform apparatus having a clamp member configured in an expanded relationship relative to a stationary frame member.

FIG. 1 illustrates the invention by example and without limitation as a novel device mounting platform apparatus 10 having a frame member 12 capable of being mounted in a vehicle and having a substantially planar device mounting surface 14 facing generally upward and a jaw portion 16 formed adjacent to one edge 18. A clamp member 20 is formed with a sled portion 22 slidably interconnected to the frame member 12 generally along a first direction (indicated by arrow 24) or a path substantially parallel therewith for extending (shown here) and retracting (shown in FIG. 2) the clamp member 20 relative to a second edge 26 of the device mounting surface 14 opposite from the first edge 18. In an expanded relationship (shown here) of the clamp member 20 relative to the frame member 12, a jaw portion 28 of the clamp member 20 is spaced along the first direction 24 away from the second edge 26 of the device mounting surface 14. In a retracted relationship (shown in FIG. 2) of the clamp member 20 relative to the frame member 12, the jaw portion 28 of the clamp member 20 is retracted along the first direction 24 into a position adjacent to the second edge 26 of the device mounting surface 14.

As illustrated here by example and without limitation, jaw portion 16 of the frame member 12 is formed with a substantially upright fence portion 30 extended along the first edge 18 and opposite end portions 32 and 34 wrapped around to opposite side edges 36 and 38 of the device mounting surface 14. The jaw portion 16 of the frame member 12 is also illustrated here by example and without limitation as being formed with a split lip portion 40 extended above the fence portion 30 and substantially overhanging the device mounting surface 14.

The jaw portion 28 of the clamp member 20 is illustrated here by example and without limitation as having a lower lip portion 42 extended crosswise of the sled portion 22 adjacent to a first extendable end 44 thereof. The jaw portion 28 of the clamp member 20 is formed with substantially upright split fence portion 46 extended along the lower lip portion 42 and opposite end portions 48 and 50 wrapped around to opposite side edges 52 and 54 thereof. The jaw portion 28 of the frame member 20 is also illustrated here by example and without limitation as being formed with a split lip portion 56 extended above the fence portion 46 and substantially overhanging both the lower lip portion 42 and the device mounting surface 14 of the frame member 12.

A portable electronics device is mounted in the novel device mounting platform apparatus 10 while the clamp member 20 is extended (shown here) by fitting between the opposing wraparound end portions 32 and 34 of the fence portion 30, and slipping a front or rear face against the frame's jaw portion 16 under the overhanging lip portion 40, and settling a bottom surface of the device against the generally upward facing device mounting surface 14. The clamp member 20 is then retracted (illustrated in FIG. 2) to move the jaw portion 28 against the opposite front or rear face of the portable device with its lower lip portion 42 under a bottom edge of the device, its fence portion 46 against the opposite front or rear face of the portable device with the wraparound end portions 48 and 50 capturing opposite corners of the device, and its lip portion 56 overhanging the portable device. The portable device is thus effectively secured in the confines of the novel device mounting platform apparatus 10 in a manner which exposes its top surface to the user.

Figure 2:
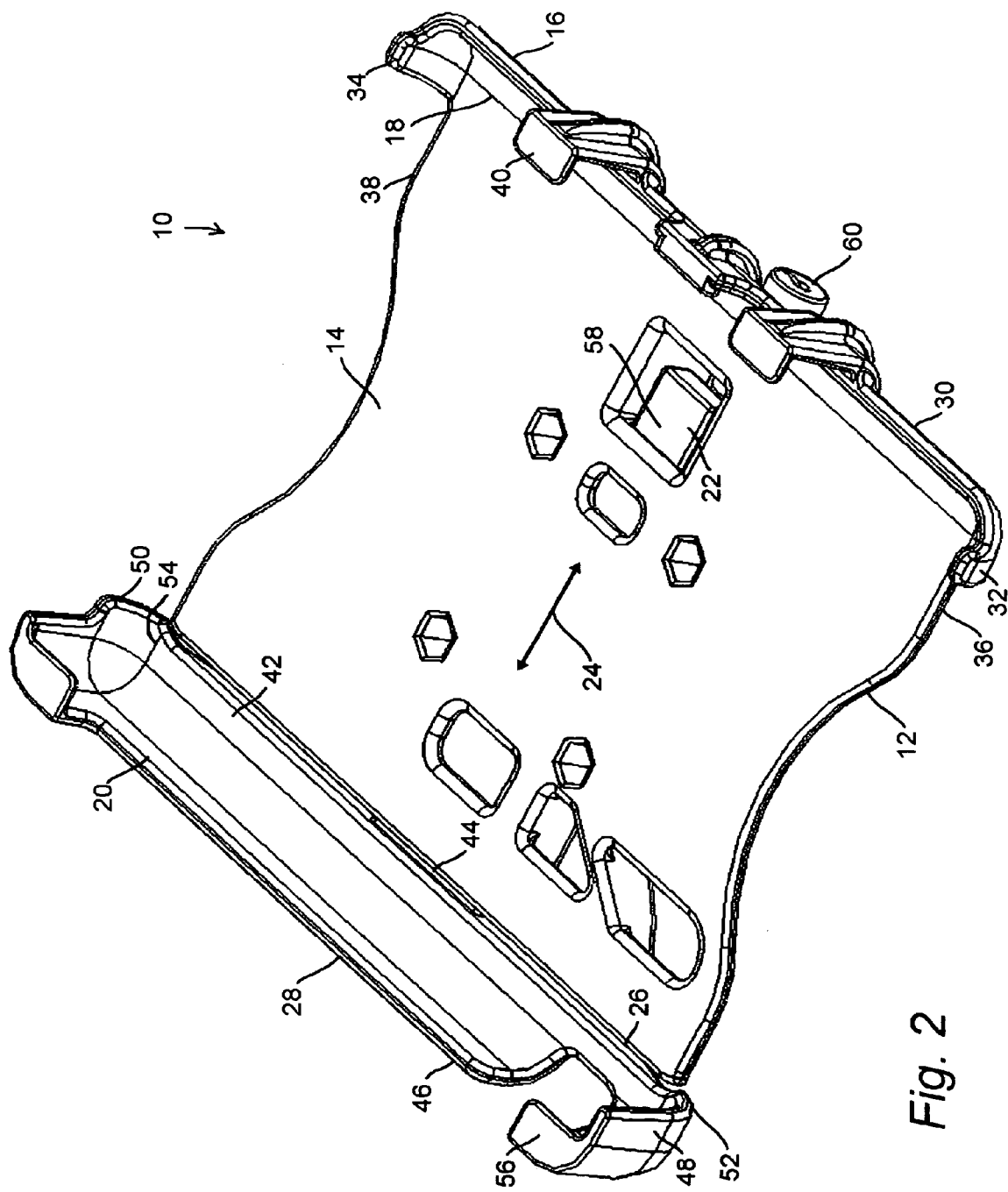
FIG. 2 is another top perspective view that illustrates the novel device mounting platform apparatus by example and without limitation as a having the clamp member configured in a retracted relationship relative to the frame member.

FIG. 2 illustrates the novel device mounting platform apparatus 10 by example and without limitation as a having the clamp member 20 configured in a retracted relationship relative to the frame member 12. Here, the jaw portion 28 of the clamp member 20 is retracted along the first direction 24 into a position adjacent to the second edge 26 of the device mounting surface 14. The frame and clamp members 12, 20 are illustrated here as being interlockable with the clamp member 20 being retracted relative to the frame member 12. By example and without limitation, a second latching end 58 of the sled portion 22 opposite from the extendable end 44 thereof is illustrated as interconnected with a catch 60 coupled to the frame member 12. The catch 60 is, for example, either a latch or lock such as a keyed lock (shown). The clamp member 20 is thus securely retained in the retracted relationship with the frame member 12 for confining the portable device.

Figure 3:
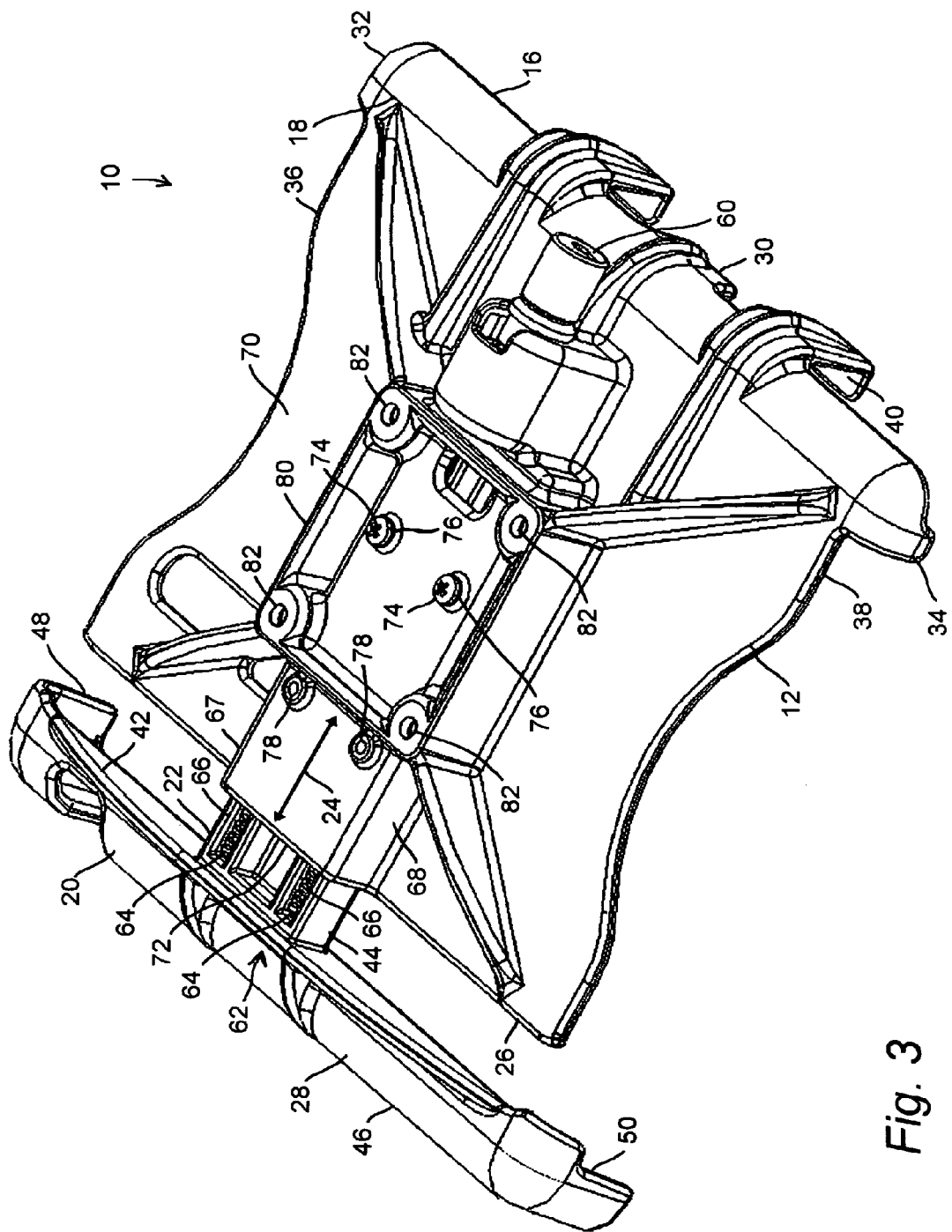
FIG. 3 is a bottom perspective view that illustrates the novel device mounting platform apparatus by example and without limitation as a having the clamp member configured in the extended relationship relative to the frame member.

FIG. 3 illustrates the novel device mounting platform apparatus 10 by example and without limitation as a having the clamp member 20 configured in the extended relationship relative to the frame member 12. Here, the jaw portion 28 of the clamp member 20 is spaced along the first direction 24 away from the second edge 26 of the device mounting surface 14.

The novel device mounting platform apparatus 10 includes a reconfigurable biasing mechanism 62 coupled between the frame member 12 and clamp member 20 for urging the clamp member 20 along the first direction 24 heading toward either the extended relationship (shown) or the retracted relationship (shown in FIG. 1) with the frame member 12. By example and without limitation, the reconfigurable biasing mechanism 62 includes one or more biasing members 64 coupled between the frame member 12 and clamp member 20 for urging the jaw portion 28 of the clamp member 20 onto a heading either toward or away from the second edge 26 of the frame member's device mounting surface 14. Here, by example and without limitation, one of the biasing members 64 is seated in each of one or more recesses or biasing member containment channels 66 formed in the sled portion 22 of the clamp member 20. A guide mechanism 67 is structured on the frame member 12 opposite from the device mounting surface 14 for guiding the sled portion 22 substantially along the first direction 24. For example, the sled portion 22 is slidingly inserted into a track 68 formed, for example as a channel, in a floor portion 70 of the frame member 12 below the device mounting surface 14 through a mouth opening 72 positioned adjacent to the second edge 26. One or more movable actuator portions 74 are coupled to the frame's floor portion 70 and cooperate with the containment channels 66 for compressing the respective biasing members 64. The actuator portions 74 are, by example and without limitation, pins or screws movable between clamp expansion positions 76 and clamp retraction positions 78 in the floor portion 70 of the frame member 12 relative to the sled portion 22 of the clamp member 20. In the clamp expansion positions 76 (shown), the actuator portions 74 are spaced away from the second edge 26 of the device mounting surface 14 toward its opposite first edge 18. The clamp retraction positions 78 position the actuator portions 74 spaced away from the first edge 18 of the device mounting surface 14 nearer to its opposite second edge 26. The actuator portions 74 thus split the biasing member containment channels 66 into expansion and retraction channel portions 66a and 66b, which are more clearly illustrated in FIG. 6 and FIG. 10, respectively.

Structure 80 is illustrated here as several mounting holes 82 for securely mounting the frame member 12 in a vehicle.

Figure 4:
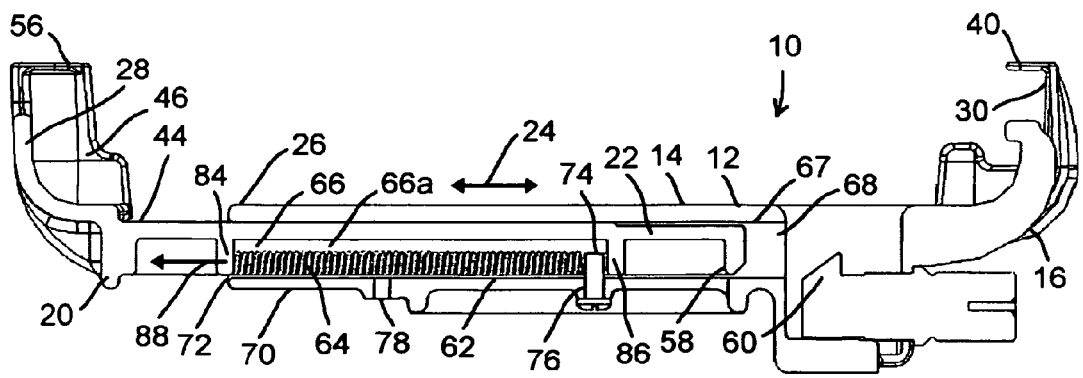
FIG. 4 is a cross-section view that illustrates by example and without limitation the novel device mounting platform apparatus as having a novel reconfigurable biasing mechanism configured in an expansion mode for urging a jaw portion of the clamp member away from the frame member, which is illustrated here with the jaw portion expanded away from the frame member.

FIG. 4 is a cross-section view that illustrates by example and without limitation the novel device mounting platform apparatus 10 as having the reconfigurable biasing mechanism 62 configured in an expansion mode. Accordingly, the actuator portions 74 are positioned in the clamp expansion positions 76 spaced away from the second edge 26 of the device mounting surface 14. The device mounting platform apparatus 10 is illustrated here as having the clamp member 20 in the expanded relationship with the frame member 12. As illustrated here, the one or more containment recesses or channels 66 formed in the sled portion 22 are optionally truncated adjacent to opposite ends by spaced apart internal reaction portions 84 and 86 for expansion and retraction, respectively, of the clamp member 20. The biasing members 64, illustrated here by example and without limitation as conventional compression springs, are captured in one of the expansion and retraction portions 66a and 66b of the channel 66 between the actuator portions 74 and one of the internal reaction portions 84 and 86 for expansion and retraction, respectively. When the reconfigurable biasing mechanism 62 is configured in the expansion mode, as illustrated here, the biasing members 64 are captured in the expansion portions 66a of the channel 66 between the actuator portions 74 and the expansive internal reaction portions 84 adjacent to the jaw portion 28 of the clamp member 20. Accordingly, the biasing members 64 and actuator portions 74 are positioned relative to the containment channels 66 for urging the sled portion 22 of the clamp member 20 to slide along the first direction 24 within the track channel 68 heading out the mouth opening 72. When the catch 60 is released from the second latching end 58 of the sled portion 22, as illustrated here, expansion of the one or more biasing members 64 generates an internal expansive biasing force 88 between the actuator portions 74 and the internal expansive reaction portions 84 that urges the sled portion 22 of the clamp member 20 on a heading along the track channel 68 for spacing the jaw portion 28 outward away from the second edge 26 of the device mounting surface 14. The distance between the spaced apart internal reaction portions 84 and 86 is a function of the desired size and strength of the spring biasing members 64, as well as the desired spacing between the jaw portion 28 from the second edge 26 of the device mounting surface 14 in the expanded relationship of the clamp member 20 and frame member 12. The internal expansive biasing force 88 thus urges the clamp member 20 to obtain or remain in its expanded relationship relative to the frame member 12. The mounting platform apparatus 10 is thus open to receive or retrieve the portable device.

The second retractive internal reaction portions 86 are optionally positioned relative to the actuator portions 74, as illustrated here, to mutually interfere along the first direction 24 to limit expansion of the clamp member 20 relative to the frame member 12. The clamp member 20 is thus restrained from expanding more than needed for inserting the portable electronic device into the mounting platform apparatus 10. Other mechanisms for restraining excess expansion of the clamp member 20 relative to the frame member 12 are also contemplated and may be substituted without departing from scope and intent of the present invention.

Figure 5:
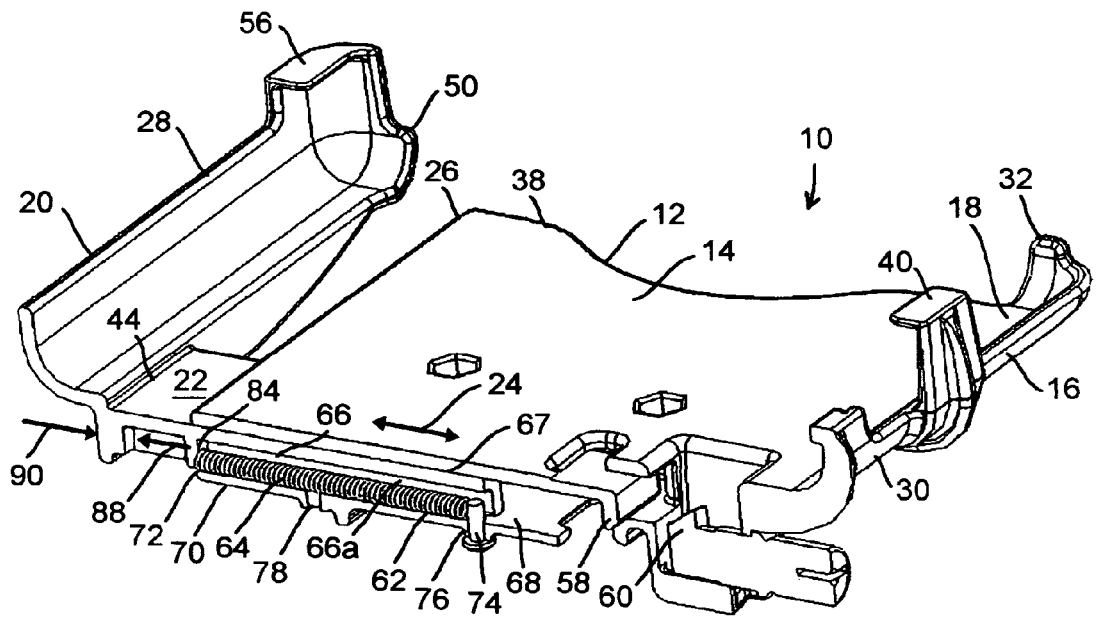
FIG. 5 is a perspective cross-section view that illustrates by example and without limitation the novel device mounting platform apparatus having the novel reconfigurable biasing mechanism configured in the expansion mode, which is illustrated here with the jaw portion expanded relative to the frame member, as illustrated in FIG. 4.

FIG. 5 is a perspective cross-section view that illustrates by example and without limitation the novel device mounting platform apparatus 10 as having the reconfigurable biasing mechanism 62 configured in an expansion mode. The retractive internal reaction portions 86 are omitted for clarity.

The clamp member 20 is forcefully expanded relative to the frame member 12 by expansion of the biasing members 64 within the expansion portions 66a of the channel 66 between the actuator portions 74 and the expansive internal reaction portions 84. The one or more biasing members 64 thus generate the internal biasing force 88 that urges the sled portion 22 of the clamp member 20 into its expanded relationship relative to the frame member 12, whereby the jaw portion 28 of the clamp member 20 is expanded along the first direction 24 into a position spaced away from the second edge 26 of the device mounting surface 14. The mounting platform apparatus 10 is thus open to receive or retrieve the portable device.

Figure 6:
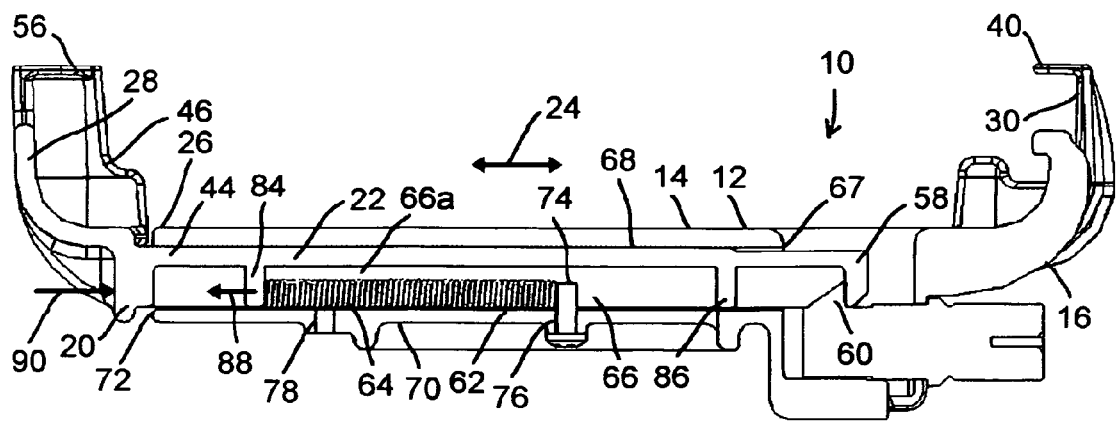
FIG. 6 is a cross-section view that illustrates by example and without limitation the novel device mounting platform apparatus as having a novel reconfigurable biasing mechanism configured in an expansion mode for urging a jaw portion of the clamp member away from the frame member, which is illustrated here with the jaw portion illustrated as being retracted relative to the frame member and interlocked therewith.

FIG. 6 is a cross-section view that illustrates the reconfigurable biasing mechanism 62 configured in an expansion mode. The device mounting platform apparatus 10 is illustrated here as having the clamp member 20 in the retracted relationship with the frame member 12. Here, an opposing external compressive force 90 greater than the internal expansive biasing force 88 must be applied for retracting the clamp member 20 relative to the frame member 12. The greater opposing external compression force 90 must overcome the internal expansion biasing force 88 to forcefully compress the biasing members 64 within the expansion portions 66a of the containment channels 66 between the actuator portions 74 and the expansive internal reaction portions 84. The sled portion 22 of the clamp member 20 is forced against the internal expansion force 88 of the biasing members 64 to move along the first direction 24 heading inwardly through the mouth opening 72 and slide relative to the floor portion 70 of the frame member 12 within the track channel 68. The sled portion 22 of the clamp member 20 is moved far enough along the track channel 68 for its latching end 58 to approach the first edge 18 of the device mounting surface 14 where it is engaged by the catch 60. The biasing members 64 are compressed in the expansion portions 66a of the containment channels 66 between the actuator portions 74 and the expansive internal reaction portions 84 and restrained against immediate expansion by engagement of the catch 60 with the latching end 58 of the sled portion 22. Accordingly, release of the catch 60 permits the compressed biasing members 64 to forcefully expand against the expansive internal reaction portions 84 of the expansion portions 66a of the channels 66. Expansion of the biasing members 64 forcefully drives the sled portion 22 of the clamp member 20 to slide along the track channel 68 in the floor portion 70 of the frame member 12 until the retractive internal reaction portions 86 encounter the actuator portions 74. The internal expansive biasing force 88 thus urges the clamp member 20 to obtain its expanded relationship relative to the frame member 12, as illustrated in FIG. 4, whereby the jaw portion 28 is spaced away from the second edge 26 of the device mounting surface 14 sufficiently to receive or retrieve the portable device.

Figure 7:
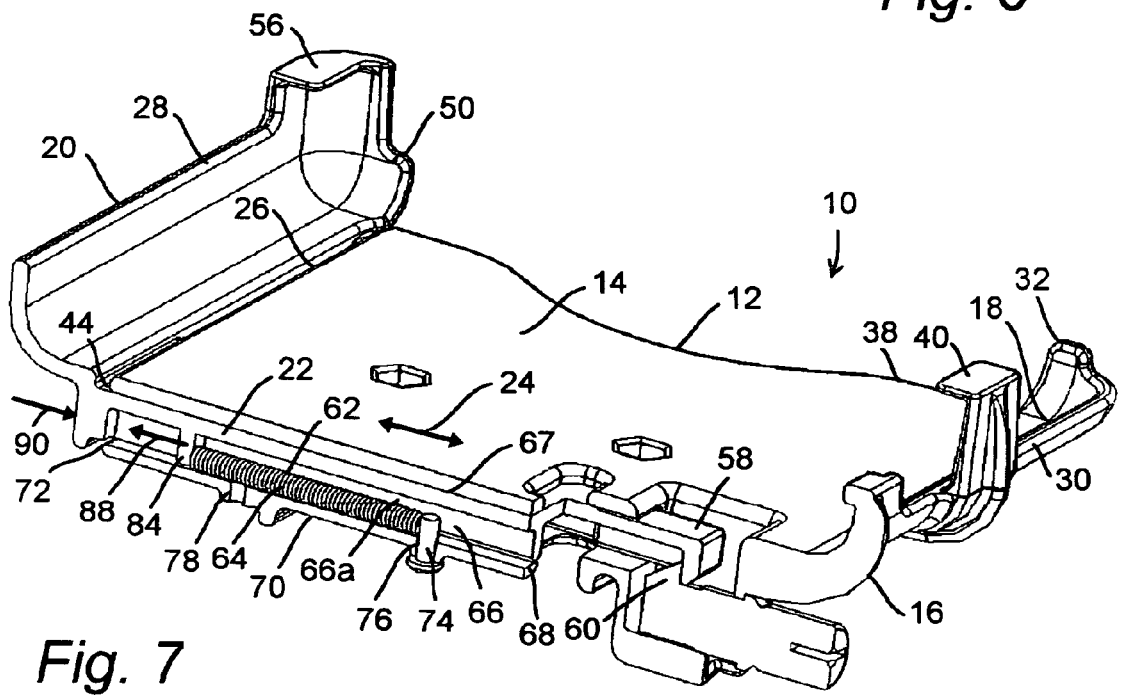
FIG. 7 is a perspective cross-section view that illustrates by example and without limitation the novel device mounting platform apparatus having the novel reconfigurable biasing mechanism configured in an expansion mode, which is illustrated here with the jaw portion retracted relative to the frame member and interlocked therewith, as illustrated in FIG. 6.

FIG. 7 is a perspective cross-section view that illustrates the reconfigurable biasing mechanism 62 configured in an expansion mode with the clamp member 20 forcefully retracted relative to the frame member 12 by compression of the biasing members 64 within the expansion portions 66a of the containment channels 66 between the actuator portions 74 and the expansive internal reaction portions 84. The retractive internal reaction portions 86 are omitted for clarity.

The external compression force 90 applied to the clamp member 20 overcomes the internal biasing force 88. The biasing members 64 are forcefully compressed within the expansion portions 66a of the containment channels 66 between the actuator portions 74 and the expansive internal reaction portions 84. The clamp member 20 is thus forcefully retracted relative to the frame member 12. The one or more biasing members 64 are thus compressed for generating the internal biasing force 88 that urges the sled portion 22 of the clamp member 20 into its expanded relationship relative to the frame member 12, whereby the jaw portion 28 of the clamp member 20 is expanded along the first direction 24 into a position spaced away from the second edge 26 of the device mounting surface 14. The mounting platform apparatus 10 is thus open to receive or retrieve the portable device, as illustrated in FIG. 5.

Figure 8:
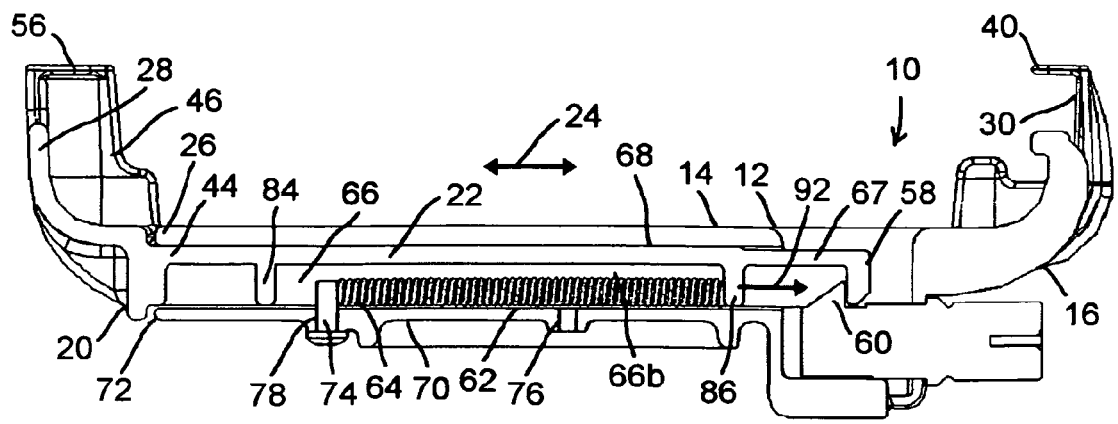
FIG. 8 is a cross-section view that illustrates by example and without limitation the device mounting platform apparatus as having the novel reconfigurable biasing mechanism configured in a retraction mode for urging a jaw portion of the clamp member toward the frame member, which is illustrated here with the jaw portion of the clamp member retracted relative to the frame member and interlocked therewith.

FIG. 8 is a cross-section view that illustrates the device mounting platform apparatus 10 as having the clamp member 20 in the retracted relationship with the frame member 12. The novel device mounting platform apparatus 10 is illustrated here by example and without limitation as having the reconfigurable biasing mechanism 62 reconfigured in a retraction mode. Accordingly, the one or more movable actuator portions 74 are repositioned from the clamp expansion positions 76 (shown in FIG. 3) to the clamp retraction positions 78 in the floor portion 70 of the frame member 12 adjacent to the second edge 26 of the device mounting surface 14. The biasing members 64 are repositioned within the containment channels 66 from the expansion portions 66a between the actuator portions 74 and the expansive internal reaction portions 84 to the retraction portions 66b between the actuator portions 74 and the retractive internal reaction portions 86 adjacent to the second latching end 58 of the sled portion 22. Accordingly, the biasing members 64 and actuator portions 74 are positioned relative to the containment channels 66 for generating an internal retraction biasing force 92 that urges the sled portion 22 of the clamp member 20 to slide along the first direction 24 within the track channel 68 heading into the mouth opening 72, rather than on a heading out of the mouth opening 72 as caused by the internal biasing force 88 generated in the expansion mode of the reconfigurable biasing mechanism 62. The internal biasing force 92 thus urges the clamp member 20 to retain its retracted relationship relative to the frame member 12.

When the reconfigurable biasing mechanism 62 is configured in the retraction mode, as illustrated here by example and without limitation, engagement of the catch 60 with the second latching end 58 of the sled portion 22 is a security mechanism for ensuring the installed portable electronics device remains securely mounted in the mounting platform apparatus 10. Furthermore, when the catch 60 is a lock as shown, the installed portable electronics device remains secure against unauthorized removal. Thus, disengagement of the catch 60 from the second latching end 58 of the sled portion 22 only permits manual retraction of the clamp member 20 relative to the frame member 12.

Figure 9:
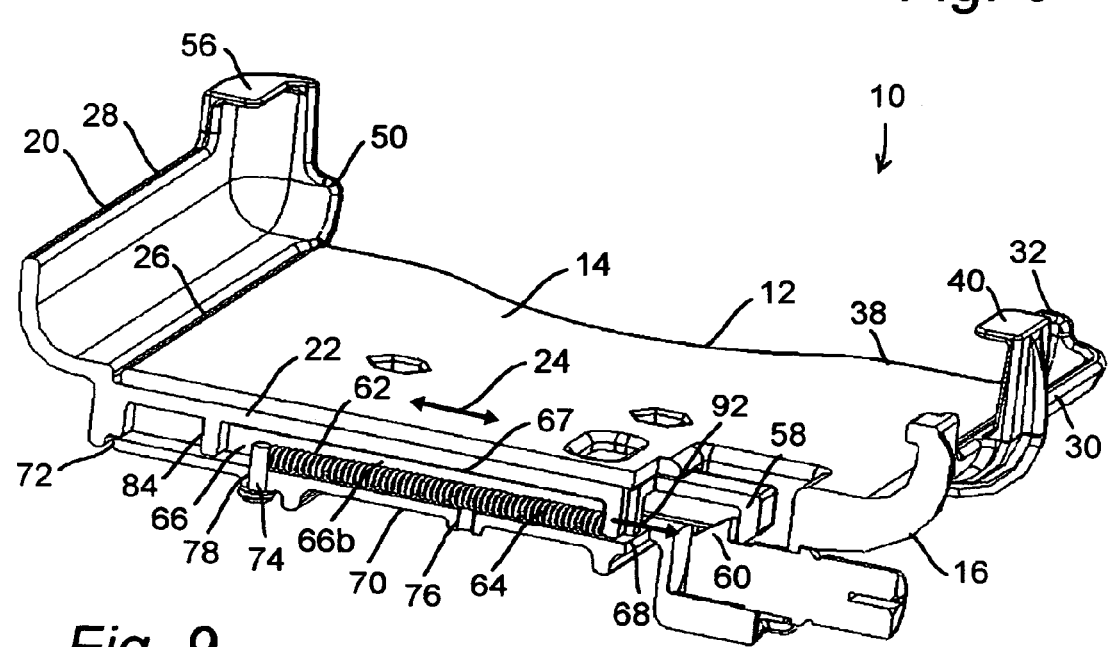
FIG. 9 is a perspective cross-section view that illustrates by example and without limitation the novel device mounting platform apparatus having the novel reconfigurable biasing mechanism configured in the retraction mode, which is illustrated here with the jaw portion retracted relative to the frame member and interlocked therewith, as illustrated in FIG. 8.

FIG. 9 is a perspective cross-section view that illustrates the reconfigurable biasing mechanism 62 configured in a retraction mode having the clamp member 20 forcefully retracted relative to the frame member 12 by expansion of the biasing members 64 within the retraction portions 66b of the containment channels 66 between the actuator portions 74 and the retractive internal reaction portions 86. The one or more biasing members 64 thus generate the internal biasing force 92 that urges the sled portion 22 of the clamp member 20 to remain in its retracted relationship relative to the frame member 12, whereby the jaw portion 28 of the clamp member 20 is retracted along the first direction 24 into a position adjacent to the second edge 26 of the device mounting surface 14.

Figure 10:
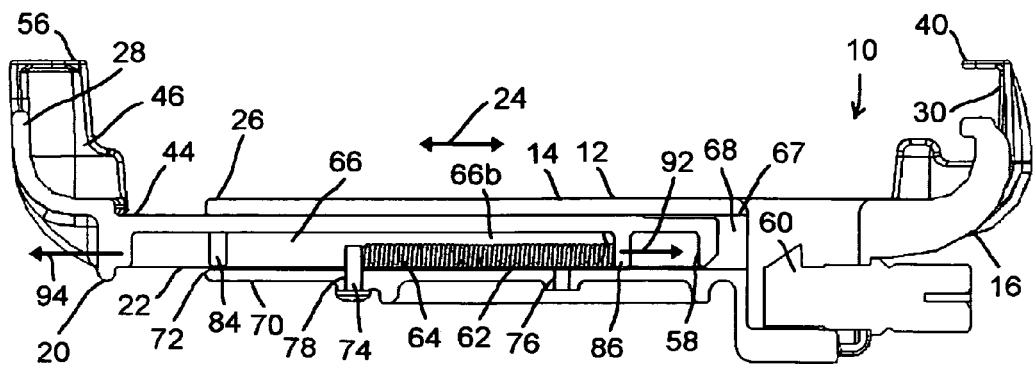
FIG. 10 is a cross-section view that illustrates by example and without limitation the novel device mounting platform apparatus as having a novel reconfigurable biasing mechanism configured in the retraction mode for urging a jaw portion of the clamp member toward the frame member, which is illustrated here with the jaw portion expanded away from the frame member.

FIG. 10 is a cross-section view that illustrates the device mounting platform apparatus 10 as having the clamp member 20 in the expanded relationship with the frame member 12. The novel device mounting platform apparatus 10 is illustrated here by example and without limitation as having the reconfigurable biasing mechanism 62 configured in a retraction mode. Accordingly, the one or more movable actuator portions 74 are positioned the clamp retraction positions 78 in the floor portion 70 of the frame member 12 adjacent to the second edge 26 of the device mounting surface 14. The biasing members 64 are positioned within the retraction portions 66b of the containment channels 66 between the actuator portions 74 and the retractive internal reaction portions 86 adjacent to the second latching end 58 of the sled portion 22. The biasing members 64 are thus positioned relative to the containment channels 66 for generating the internal biasing force 92 that urges the sled portion 22 of the clamp member 20 to slide along the first direction 24 within the track channel 68 into the mouth opening 72. The internal biasing force 92 thus urges the clamp member 20 to obtain or remain in its retracted relationship relative to the frame member 12, as illustrated in FIG. 8.

When the catch 60 is released from the second latching end 58 of the sled portion 22, as illustrated here, an opposing external expansive force 94 greater than the internal retractive biasing force 92 must be applied for expanding the clamp member 20 relative to the frame member 12. The greater opposing external expansion force 94 must overcome the internal retractive biasing force 92 to forcefully compress the biasing members 64 within the retraction portions 66b of the containment channels 66 between the actuator portions 74 and the retractive internal reaction portions 86. The sled portion 22 of the clamp member 20 is forced against the internal expansion force 92 of the biasing members 64 to head along the first direction 24 outwardly through the mouth opening 72 and slide relative to the floor portion 70 of the frame member 12 within the track channel 68. The sled portion 22 of the clamp member 20 is moved far enough along the track channel 68 to receive or retrieve the portable device. The biasing members 64 are compressed in the retraction portions 66b of the containment channels 66 between the actuator portions 74 and the retractive internal reaction portions 86. A limiting mechanism is optionally provided for limiting travel of the clamp member 20. Alternatively, mere compression of the biasing members 64 can be relied upon for limiting travel of the clamp member 20. The mounting platform apparatus 10 is thus open to receive or retrieve the portable device.

A trigger mechanism is optionally provided for restraining the compressed biasing members 64 against immediate expansion. Accordingly, removal of the external expansion force 94 permits the compressed biasing members 64 to forcefully expand against the retractive internal reaction portions 86 within the retraction portions 66b of the channels 66. Expansion of the biasing members 64 forcefully drives the sled portion 22 of the clamp member 20 to slide inwardly along the track channel 68 in the floor portion 70 of the frame member 12 until the second latching end 58 of the sled portion 22 encounters the catch 60 and is engaged therewith.

Figure 11:
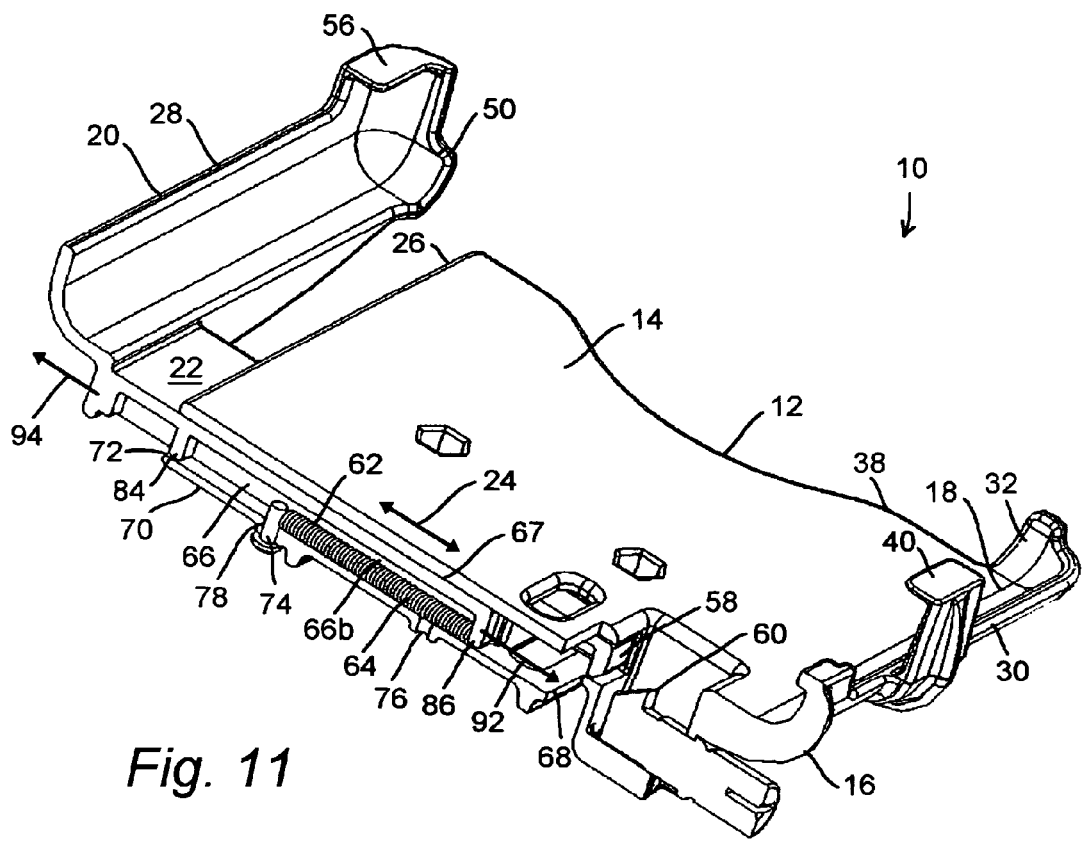
FIG. 11 is a perspective cross-section view that illustrates by example and without limitation the novel device mounting platform apparatus having the novel reconfigurable biasing mechanism configured in the retraction mode, which is illustrated here with the jaw portion expanded relative to the frame member, as illustrated in FIG. 10.

FIG. 11 is a perspective cross-section view that illustrates the reconfigurable biasing mechanism 62 configured in a retraction mode having the clamp member 20 forcefully expanded relative to the frame member 12 by application of the external expansion force 94 for overcoming the internal biasing force 92. The biasing members 64 are thus manually compressed within the retraction portions 66b of the containment channels 66 between the actuator portions 74 and the retractive internal reaction portions 86 by the external expansion force 94. Compression between the actuator portions 74 and the retractive internal reaction portions 86 causes the one or more biasing members 64 to generate the internal biasing force 92 that urges the sled portion 22 of the clamp member 20 to retract into the track channel 68 formed in a floor portion 70 of the frame member 12 where its second latching end 58 is engaged with the catch 60. In this retraction mode of the reconfigurable biasing mechanism 62, only the externally applied expansion force 94 retains the clamp member 20 in its retracted relationship relative to the frame member 12, whereby the jaw portion 28 of the clamp member 20 is expanded along the first direction 24 into a position spaced away from the second edge 26 of the device mounting surface 14 for receiving or retrieving the portable device. Accordingly, when the external expansion force 94 is removed, the one or more biasing members 64 generate the internal biasing force 92 that urges the sled portion 22 to retract into the track channel 68, whereby the clamp member 20 is substantially automatically retracted relative to the frame member 12. The mounting platform apparatus 10 thus securely retains the portable device in a manner which exposes its top surface to the user.

Figure 12:
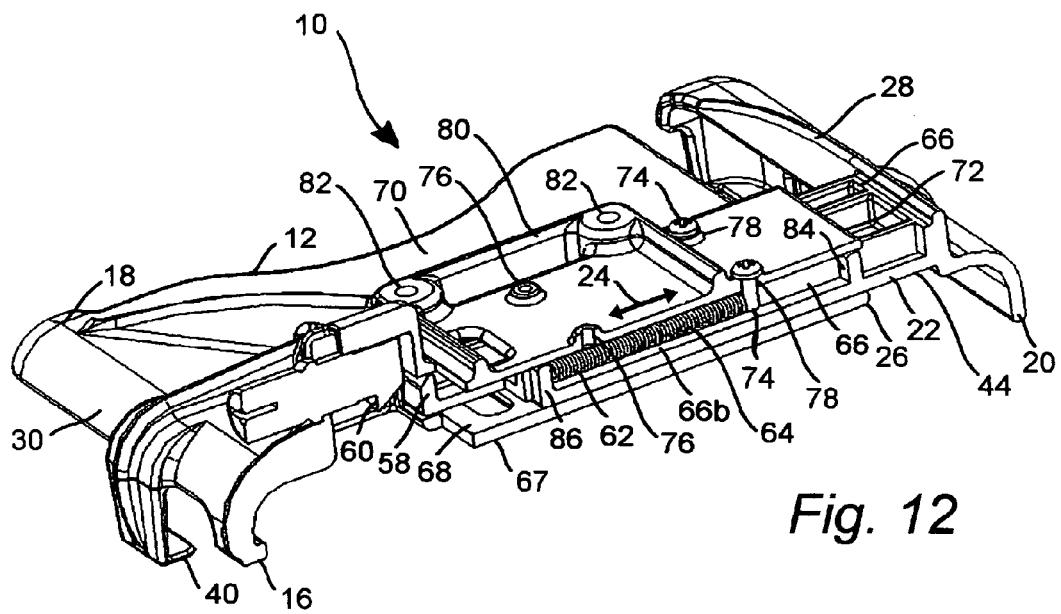
Figure 13:
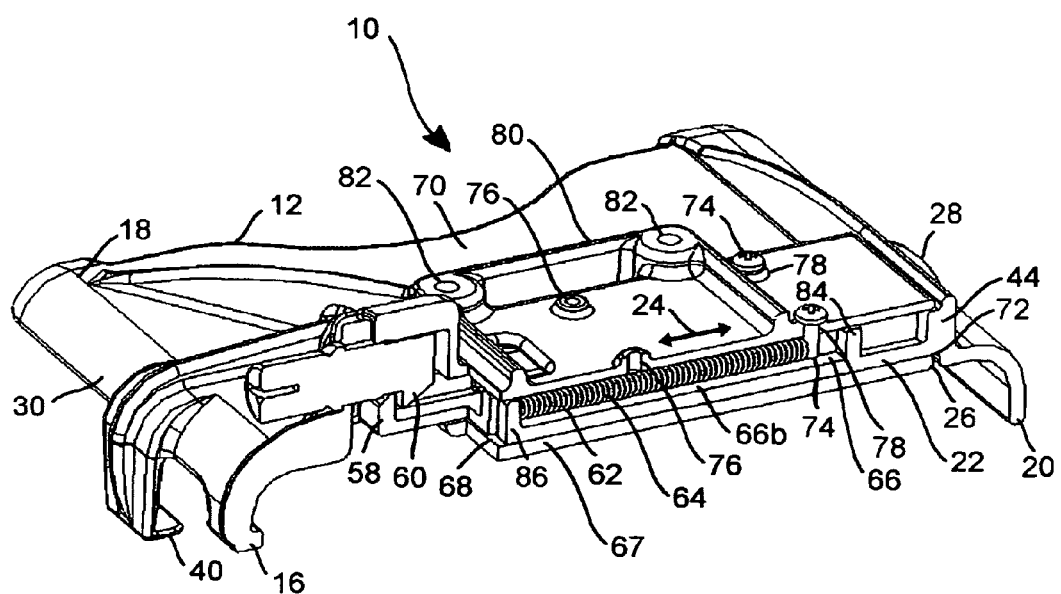

FIGS. 12 and 13 are bottom perspective cross-section views that illustrate the novel mounting platform apparatus 10 having the reconfigurable biasing mechanism 62 configured in a retraction mode. FIG. 12 illustrates the clamp member 20 being forcefully expanded relative to the frame member 12 by the externally applied expansion force 94 overcoming the internal expansive biasing force 92 and compressing the one or more biasing members 64 between the actuator portions 74 and the retractive internal reaction portions 86. The clamp member 20 is thus in its retracted relationship with the frame member 12. FIG. 13 illustrates the clamp member 20 being forcefully retracted into its retracted relationship with the frame member 12 by the internal expansive biasing force 92 generated by expansion of the one or more biasing members 64 between the actuator portions 74 and the retractive internal reaction portions 86. The clamp member 20 is thus in its expanded relationship with the frame member 12.

FIG. 14 is a cross-section view that illustrates the device mounting platform apparatus 10 as having the clamp member 20 in the expanded relationship with the frame member 12. The novel device mounting platform apparatus 10 is illustrated here by example and without limitation as having an alternative embodiment of the reconfigurable biasing mechanism 62 having the positions of the actuator portions 74 switched with positions of the internal reaction portions 84 and 86. Accordingly, the internal reaction portions 84 and 86 are provided on the frame member 12 in spaced apart positions along the track channel 68 with the retractive internal reaction portions 86 being positioned adjacent to the second edge 26 of the frame member 12, while the expansive internal reaction portions 84 are spaced away therefrom toward the first edge 18. The containment channels 66 are formed in the floor portion 70 of the frame member 12 between the internal reaction portions 84 and 86. The actuator portions 74 are provided on the sled portion 22 of the clamp member 20 in the spaced apart between clamp expansion positions 76 and clamp retraction positions 78 between the internal reaction portions 84 and 86. The clamp expansion positions 76 are positioned adjacent to the jaw portion 28 of the clamp member 20, while the clamp retraction positions 78 are spaced away therefrom adjacent to the second latching end 58 of the sled portion 22. The actuator portions 74 are movable between the clamp expansion and retraction positions 76 and 78 for forming the expansion and retraction portions 66a and 66b within the containment channels 66 and configuring the reconfigurable biasing mechanism 62 in the different expansion and retraction modes, respectively.

Here, the reconfigurable biasing mechanism 62 is configured in an expansion mode. Accordingly, the actuator portions 74 are positioned in the clamp expansion positions 76 spaced away from the second latching end 58 of the sled portion 22. The biasing members 64 are captured in the expansion portions 66a of the containment channels 66 between the actuator portions 74 and the internal expansive reaction portions 84 adjacent to the jaw portion 28 of the clamp member 20. Accordingly, the biasing members 64 and actuator portions 74 are positioned relative to the containment channels 66 for urging the sled portion 22 of the clamp member 20 to slide along the first direction 24 within the track channel 68 heading out the mouth opening 72. When the catch 60 is released from the second latching end 58 of the sled portion 22, as illustrated here, expansion of the one or more biasing members 64 generates the internal expansive biasing force 88 between the actuator portions 74 and the internal expansive reaction portions 84 that urges the sled portion 22 of the clamp member 20 on a heading along the track channel 68 for spacing the jaw portion 28 outward away from the second edge 26 of the device mounting surface 14. The internal expansive biasing force 88 thus urges the clamp member 20 to obtain or remain in its expanded relationship relative to the frame member 12. The mounting platform apparatus 10 is thus open to receive or retrieve the portable device.

The second retractive internal reaction portions 86 are optionally positioned relative to the actuator portions 74, as illustrated here, to mutually interfere along the first direction 24 to limit expansion of the clamp member 20 relative to the frame member 12. The clamp member 20 is thus restrained from expanding more than needed for inserting the portable electronic device into the mounting platform apparatus 10. Other mechanisms for restraining excess expansion of the clamp member 20 relative to the frame member 12 are also contemplated and may be substituted without departing from scope and intent of the present invention.

FIG. 15 is a cross-section view that illustrates the alternative reconfigurable biasing mechanism 62 configured in an expansion mode. Here, the opposing external compressive force 90 greater than the internal expansive biasing force 88 must be applied for retracting the clamp member 20 relative to the frame member 12. The device mounting platform apparatus 10 is illustrated here as having the clamp member 20 in the retracted relationship with the frame member 12. The greater opposing external compression force 90 must overcome the internal expansion biasing force 88 to forcefully compress the biasing members 64 within the expansion portions 66a of the containment channels 66 between the actuator portions 74 and the expansive internal reaction portions 84. The sled portion 22 of the clamp member 20 is forced against the internal expansion force 88 of the biasing members 64 to move along the first direction 24 heading inwardly through the mouth opening 72 and slide relative to the floor portion 70 of the frame member 12 within the track channel 68. The sled portion 22 of the clamp member 20 is moved far enough along the track channel 68 for its latching end 58 to approach the first edge 18 of the device mounting surface 14 where it is engaged by the catch 60. The biasing members 64 are compressed in the expansion portions 66a of the containment channels 66 between the actuator portions 74 and the expansive internal reaction portions 84 and restrained against immediate expansion by engagement of the catch 60 with the latching end 58 of the sled portion 22. Accordingly, release of the catch 60 permits the compressed biasing members 64 to forcefully expand against the expansive internal reaction portions 84 within the expansion portions 66a of the channels 66. Expansion of the biasing members 64 forcefully drives the sled portion 22 of the clamp member 20 to slide along the track channel 68 in the floor portion 70 of the frame member 12 until the actuator portions 74 encounter the retractive internal reaction portions 86. The internal expansive biasing force 88 thus urges the clamp member 20 to obtain its expanded relationship relative to the frame member 12, as illustrated in FIG. 14, whereby the jaw portion 28 is spaced away from the second edge 26 of the device mounting surface 14 sufficiently to receive or retrieve the portable device.

FIG. 16 is a cross-section view that illustrates the device mounting platform apparatus 10 as having the clamp member 20 in the retracted relationship with the frame member 12. The novel device mounting platform apparatus 10 is illustrated here by example and without limitation as having the alternative reconfigurable biasing mechanism 62 reconfigured in a retraction mode. Accordingly, the one or more movable actuator portions 74 are repositioned from the clamp expansion positions 76 (shown in FIG. 14) to the clamp retraction positions 78 in the sled portion 22 of the clamp member 20 adjacent to the second latching end 58. The biasing members 64 are repositioned within the containment channels 66 from the expansion portions 66a between the actuator portions 74 and the expansive internal reaction portions 84 to the retraction portions 66b of the containment channels 66 between the actuator portions 74 and the retractive internal reaction portions 86 adjacent to the second edge 26 of the device mounting surface 14. Accordingly, the biasing members 64 and actuator portions 74 are positioned relative to the containment channels 66 for generating the internal retraction biasing force 92 that urges the sled portion 22 of the clamp member 20 to slide along the first direction 24 within the track channel 68 heading into the mouth opening 72, rather than on a heading out of the mouth opening 72 as caused by the internal biasing force 88 generated in the expansion mode of the alternative reconfigurable biasing mechanism 62. The internal biasing force 92 thus urges the clamp member 20 to retain its retracted relationship relative to the frame member 12.

When the alternative reconfigurable biasing mechanism 62 is configured in the retraction mode, as illustrated here by example and without limitation, engagement of the catch 60 with the second latching end 58 of the sled portion 22 is a security mechanism for ensuring the installed portable electronics device remains securely mounted in the mounting platform apparatus 10. Furthermore, when the catch 60 is a lock as shown, the installed portable electronics device remains secure against unauthorized removal. Thus, disengagement of the catch 60 from the second latching end 58 of the sled portion 22 only permits manual retraction of the clamp member 20 relative to the frame member 12.

FIG. 17 is a cross-section view that illustrates by example and without limitation the novel device mounting platform apparatus 10 as having the clamp member 20 in the expanded relationship with the frame member 12. The alternative reconfigurable biasing mechanism 62 is configured here in a retraction mode. Accordingly, the one or more movable actuator portions 74 are positioned the clamp retraction positions 78 of the clamp member 20 adjacent to the second latching end 58 of the sled portion 22. The biasing members 64 are positioned within the retraction portions 66b of the containment channels 66 between the actuator portions 74 and the retractive internal reaction portions 86 in the floor portion 70 of the frame member 12 adjacent to the second edge 26 of the device mounting surface 14. The biasing members 64 are thus positioned relative to the containment channels 66 for generating the internal biasing force 92 that urges the sled portion 22 of the clamp member 20 to slide along the first direction 24 within the track channel 68 on a heading into the mouth opening 72. The internal biasing force 92 thus urges the clamp member 20 to obtain its retracted relationship relative to the frame member 12, as illustrated in FIG. 16.

When the catch 60 is released from the second latching end 58 of the sled portion 22, as illustrated here, an opposing external expansive force 94 greater than the internal retractive biasing force 92 must be applied for expanding the clamp member 20 relative to the frame member 12. The greater opposing external expansion force 94 must overcome the internal retractive biasing force 92 to forcefully compress the biasing members 64 within the retraction portions 66b of the containment channels 66 between the actuator portions 74 and the retractive internal reaction portions 86. The sled portion 22 of the clamp member 20 is forced against the internal expansion force 92 of the biasing members 64 to head along the first direction 24 outwardly through the mouth opening 72 and slide relative to the floor portion 70 of the frame member 12 within the track channel 68. The sled portion 22 of the clamp member 20 is moved far enough along the track channel 68 to receive or retrieve the portable device. The biasing members 64 are compressed within the retraction portions 66b of the containment channels 66 between the actuator portions 74 and the retractive internal reaction portions 86. The mounting platform apparatus 10 is thus open to receive or retrieve the portable device. A limiting mechanism is optionally provided for limiting travel of the clamp member 20. Alternatively, mere compression of the biasing members 64 can be relied upon for limiting travel of the clamp member 20.

A trigger mechanism is optionally provided for restraining the compressed biasing members 64 against immediate expansion, and thereby retraction of the clamp member 20. Accordingly, removal of the external expansion force 94 permits the compressed biasing members 64 to forcefully expand between the actuator portions 74 and the retractive internal reaction portions 86 within the retraction portions 66b of the channels 66. Expansion of the biasing members 64 forcefully drives the sled portion 22 of the clamp member 20 to slide inwardly along the track channel 68 in the floor portion 70 of the frame member 12 until the second latching end 58 of the sled portion 22 encounters the catch 60 and is engaged therewith, or the actuator portions 74 encounter the expansive internal reaction portions 84, whichever occurs first.

As discussed herein, the alternative embodiment of the reconfigurable biasing mechanism 62 described in FIGS. 14-17 operates substantially the same as the embodiment described in FIGS. 4-13.

FIG. 18 is a cross-section view that illustrates the device mounting platform apparatus 10 as having the clamp member 20 in the expanded relationship with the frame member 12. The novel device mounting platform apparatus 10 is illustrated here by example and without limitation as having another alternative embodiment of the reconfigurable biasing mechanism 62 having the actuator portions 74 being stationary in single fixed positions 96 between the internal reaction portions 84 and 86. Here, the reversible biasing members 64 are switched between the stationary actuator portions 74 and one of the internal reaction portions 84 and 86 for expansion and retraction, respectively. When the alternative reconfigurable biasing mechanism 62 is configured in the expansion mode, as illustrated here, the biasing members 64 are captured in the expansion portions 66a of the containment channels 66 between the actuator portions 74 and the expansive internal reaction portions 84 adjacent to the jaw portion 28 of the clamp member 20. Accordingly, the biasing members 64 and actuator portions 74 are positioned relative to the containment channels 66 for urging the sled portion 22 of the clamp member 20 to slide along the first direction 24 within the track channel 68 heading out the mouth opening 72. When the catch 60 is released from the second latching end 58 of the sled portion 22, as illustrated here, expansion of the one or more biasing members 64 generates the internal expansive biasing force 88 between the stationary actuator portions 74 and the internal expansive reaction portions 84 that urges the sled portion 22 of the clamp member 20 on a heading along the track channel 68 for spacing the jaw portion 28 outward away from the second edge 26 of the device mounting surface 14. The distance between the spaced apart internal reaction portions 84 and 86 is a function of the desired size and strength of the spring biasing members 64, as well as the desired spacing between the jaw portion 28 from the second edge 26 of the device mounting surface 14 in the expanded relationship of the clamp member 20 and frame member 12. The internal expansive biasing force 88 thus urges the clamp member 20 to obtain or remain in its expanded relationship relative to the frame member 12. The mounting platform apparatus 10 is thus open to receive or retrieve the portable device.

An expansion restraining mechanisms is optionally provided for restraining excess expansion of the clamp member 20 relative to the frame member 12. Such expansion restraining mechanisms are contemplated and may be substituted without departing from scope and intent of the present invention.

FIG. 19 is a cross-section view that illustrates the alternative reconfigurable biasing mechanism 62 configured in an expansion mode. The device mounting platform apparatus 10 is illustrated here as having the clamp member 20 in the retracted relationship with the frame member 12. Here, the opposing external compressive force 90 greater than the internal expansive biasing force 88 must be applied for retracting the clamp member 20 relative to the frame member 12. The greater opposing external compression force 90 must overcome the internal expansion biasing force 88 to forcefully compress the biasing members 64 within the expansion portions 66a of the containment channels 66 between the stationary actuator portions 74 and the expansive internal reaction portions 84. The sled portion 22 of the clamp member 20 is forced against the internal expansion force 88 of the biasing members 64 to move along the first direction 24 heading inwardly through the mouth opening 72 and slide relative to the floor portion 70 of the frame member 12 within the track channel 68. The sled portion 22 of the clamp member 20 is moved far enough along the track channel 68 for its latching end 58 to approach the first edge 18 of the device mounting surface 14 where it is engaged by the catch 60. The biasing members 64 are compressed in the expansion portions 66a of the containment channels 66 between the stationary actuator portions 74 and the expansive internal reaction portions 84 and restrained against immediate expansion by engagement of the catch 60 with the latching end 58 of the sled portion 22. Accordingly, release of the catch 60 permits the compressed biasing members 64 to forcefully expand against the expansive internal reaction portions 84 of the expansion portions 66a of the channels 66. Expansion of the biasing members 64 forcefully drives the sled portion 22 of the clamp member 20 to slide along the track channel 68 in the floor portion 70 of the frame member 12 until the retractive internal reaction portions 86 encounter the stationary actuator portions 74 or another expansion restraining mechanisms is actuated for restraining excess expansion of the clamp member 20 relative to the frame member 12. The internal expansive biasing force 88 thus urges the clamp member 20 to obtain its expanded relationship relative to the frame member 12, as illustrated in FIG. 18, whereby the jaw portion 28 is spaced away from the second edge 26 of the device mounting surface 14 sufficiently to receive or retrieve the portable device.

FIG. 20 is a cross-section view that illustrates the device mounting platform apparatus 10 as having the clamp member 20 in the retracted relationship with the frame member 12. The novel device mounting platform apparatus 10 is illustrated here by example and without limitation as having the alternative reconfigurable biasing mechanism 62 reconfigured in a retraction mode. Accordingly, the one or more repositionable biasing members 64 are repositioned within the containment channels 66 from the expansion portions 66a between the stationary actuator portions 74 and the expansive internal reaction portions 84 to the retraction portions 66b between the stationary actuator portions 74 and the retractive internal reaction portions 86 adjacent to the second latching end 58 of the sled portion 22. Accordingly, the biasing members 64 are positioned relative to the containment channels 66 and stationary actuator portions 74 for generating the internal retraction biasing force 92 that urges the sled portion 22 of the clamp member 20 to slide along the first direction 24 within the track channel 68 heading into the mouth opening 72, rather than on a heading out of the mouth opening 72 as caused by the internal biasing force 88 generated in the expansion mode of the reconfigurable biasing mechanism 62. The internal biasing force 92 thus urges the clamp member 20 to retain its retracted relationship relative to the frame member 12.

When the alternative reconfigurable biasing mechanism 62 is configured in the retraction mode, as illustrated here by example and without limitation, engagement of the catch 60 with the second latching end 58 of the sled portion 22 is a security mechanism for ensuring the installed portable electronics device remains securely mounted in the mounting platform apparatus 10. Furthermore, when the catch 60 is a lock as shown, the installed portable electronics device remains secure against unauthorized removal. Thus, disengagement of the catch 60 from the second latching end 58 of the sled portion 22 only permits manual retraction of the clamp member 20 relative to the frame member 12.

FIG. 21 is a cross-section view that illustrates by example and without limitation the novel device mounting platform apparatus 10 as having the clamp member 20 in the expanded relationship with the frame member 12. The alternative reconfigurable biasing mechanism 62 is configured in a retraction mode. Accordingly, the one or more biasing members 64 are positioned within the retraction portions 66b of the containment channels 66 between the stationary actuator portions 74 and the retractive internal reaction portions 86 adjacent to the second latching end 58 of the sled portion 22. The biasing members 64 are thus positioned relative to the containment channels 66 for generating the internal biasing force 92 that urges the sled portion 22 of the clamp member 20 to slide along the first direction 24 within the track channel 68 into the mouth opening 72. The internal biasing force 92 thus urges the clamp member 20 to obtain or remain in its retracted relationship relative to the frame member 12, as illustrated in FIG. 20.

When the catch 60 is released from the second latching end 58 of the sled portion 22, as illustrated here, the opposing external expansive force 94 greater than the internal retractive biasing force 92 must be applied for expanding the clamp member 20 relative to the frame member 12. The greater opposing external expansion force 94 must overcome the internal retractive biasing force 92 to forcefully compress the biasing members 64 within the retraction portions 66b of the containment channels 66 between the stationary actuator portions 74 and the retractive internal reaction portions 86. The sled portion 22 of the clamp member 20 is forced against the internal expansion force 92 of the biasing members 64 to head along the first direction 24 outwardly through the mouth opening 72 and slide relative to the floor portion 70 of the frame member 12 within the track channel 68. The sled portion 22 of the clamp member 20 is moved far enough along the track channel 68 to receive or retrieve the portable device. The biasing members 64 are compressed in the retraction portions 66b of the containment channels 66 between the stationary actuator portions 74 and the retractive internal reaction portions 86. A limiting mechanism is optionally provided for limiting travel of the clamp member 20. Alternatively, mere compression of the biasing members 64 can be relied upon for limiting travel of the clamp member 20. The mounting platform apparatus 10 is thus open to receive or retrieve the portable device.

A trigger mechanism is optionally provided for restraining the compressed biasing members 64 against immediate expansion. Accordingly, removal of the external expansion force 94 permits the compressed biasing members 64 to forcefully expand against the retractive internal reaction portions 86 within the retraction portions 66b of the channels 66. Expansion of the biasing members 64 forcefully drives the sled portion 22 of the clamp member 20 to slide inwardly along the track channel 68 in the floor portion 70 of the frame member 12 until the second latching end 58 of the sled portion 22 encounters the catch 60 and is engaged therewith.

As discussed herein, the alternative embodiment of the reconfigurable biasing mechanism 62 described in FIGS. 18-21 operates substantially the same as the embodiment described in FIGS. 4-13. However, the fixed positions 96 of the stationary actuator portions 74 of the reconfigurable biasing mechanism 62 split the biasing member containment channels 66 into shorter expansion and retraction channel portions 66a and 66b than is possible using the repositionable actuator portions 74 switched between the clamp expansion positions 76 and clamp retraction positions 78 because alternating between the clamp expansion and retraction positions 76 and 78 places the repositionable actuator portions 74 alternately further from the respective internal reaction portions 84 and 86. The longer expansion and retraction channel portions 66a and 66b permits use longer spring biasing members 64, which permits greater control over spring rate.

The frame member 12 is optionally molded of any moldable material, including but not limited to plastic, metal and composite moldable materials. The frame member 12 is molded using any molding process, including but not limited to injection molding, casting, and die casting using the moldable material appropriate to the molding process. The frame member 12 thus consists of any moldable material in a molded form. Furthermore, the structure 80 for securely mounting the frame member 12 in a vehicle is optionally molded integrally with the frame member 12 as a single unit.

The jaw portion 16 of the frame member 12, including the fence portion 30 extended along the first edge 18 of the frame member 12, is optionally molded of any of the moldable materials using any of the molding processes. According to one embodiment, the jaw portion 16 including the fence portion 30 is optionally molded integrally with the frame member 12 as a single unit.

The clamp member 20 is optionally molded of any of the moldable materials using any of the molding processes.

Figure 22:
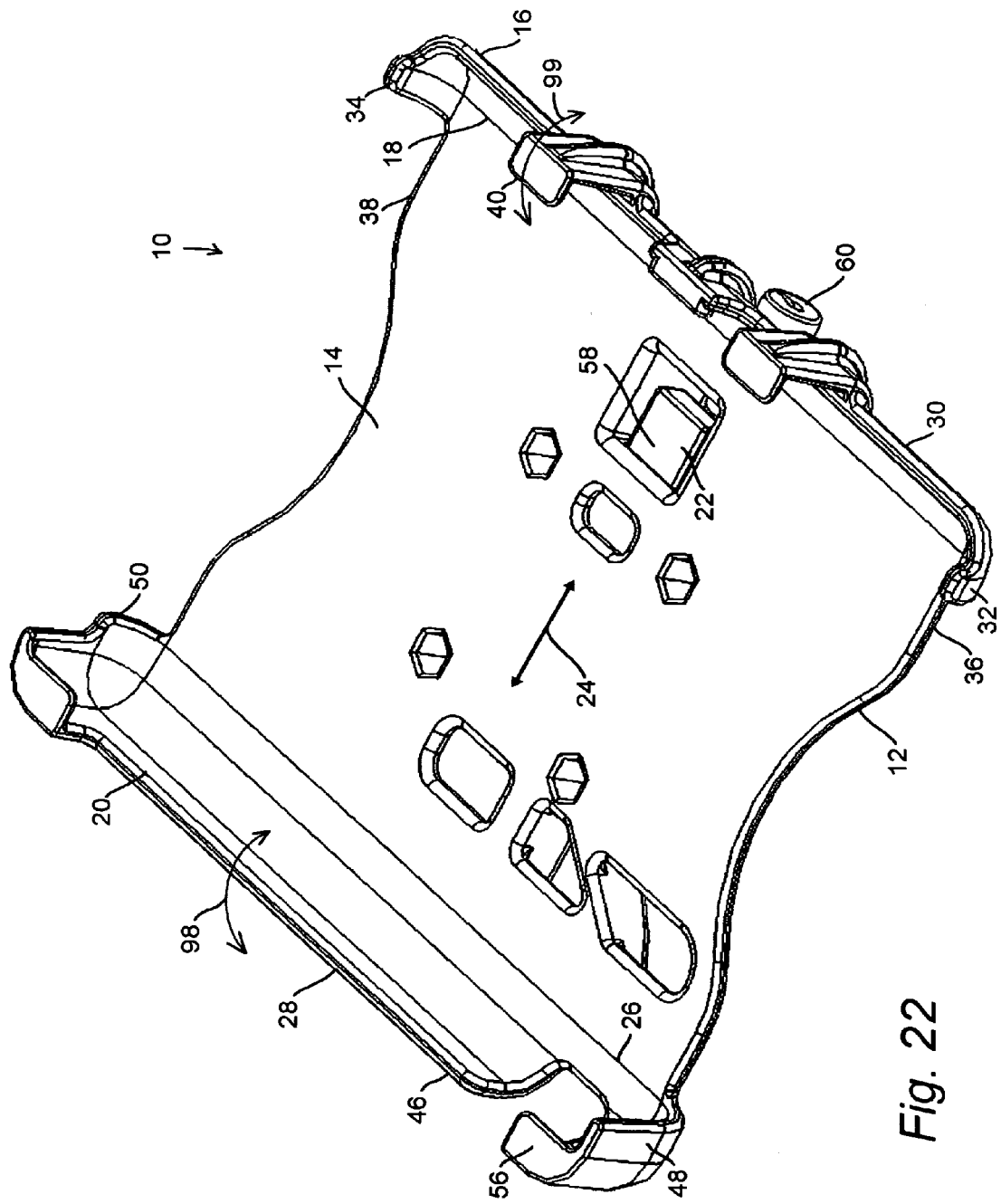
FIG. 22 is another top perspective view that illustrates the novel device mounting platform apparatus having the frame member molded of any moldable material by any appropriate molding process, and further illustrates the a jaw portion that is optionally molded integrally with the frame member as a single unit, and a clamp member that also is optionally molded integrally with the frame member as a single unit.

FIG. 22 illustrates another embodiment of the novel device mounting platform apparatus 10 wherein the clamp member 20 including the jaw portion 28 is optionally molded integrally with the frame member 12 as a single unit. As further illustrated by arrow 98 in FIG. 22, the jaw portion 28 of the clamp member 20 is optionally resiliently flexible substantially along the first direction 24. When the jaw portion 28 is resiliently flexible, the clamp member 20 is resiliently expandable into the expanded relationship relative to the frame member 12 so the jaw portion 28 is spaced along the first direction 24 away from the second edge 26 of the device mounting surface 14. With the clamp member 20 in this expanded relationship, a portable electronics device such as a laptop, mini-laptop, notebook, netbook, or ultra mobile personal computer (UMPC) is easily slipped past the jaw portion 28 and seated against the device mounting surface 14. Thereafter, the clamp member 20 resiliently retracts into the retracted relationship (shown in FIG. 2) relative to the frame member 12, and the jaw portion 28 is retracted along the first direction 24 into its retracted position adjacent to the second edge 26 of the device mounting surface 14 for retaining the portable electronics device therein.

As illustrated by arrow 99 in FIG. 22, the fence portion 30 of the jaw portion 16 is optionally resiliently flexible substantially along the first direction 24. When the fence portion 30 is resiliently flexible, the jaw portion 16 is resiliently moveable substantially along the first direction 24 between an expanded relationship relative to the frame member 12 having the fence portion 30 spaced away from the first edge 18 of the device mounting surface 14 along the first direction 24, and a retracted relationship having the fence portion 30 retracted along the first direction 24 into a position adjacent to the first edge 18 of the device mounting surface 14. Resilient motion of the fence portion 30 of the jaw portion 16 into an expanded relationship relative to the frame member 12 spaces the fence portion 30 of the jaw portion 16 along the first direction 24 away from the first edge 18 of the device mounting surface 14. With the jaw portion 16 in this expanded relationship, a portable electronics device such as a laptop, mini-laptop, notebook, netbook, or ultra mobile personal computer (UMPC) is easily slipped past the fence portion 30 and seated against the device mounting surface 14. Thereafter, the jaw portion 16 resiliently retracts into the retracted relationship relative to the frame member 12, and the fence portion 30 is retracted along the first direction 24 into its retracted position adjacent to the first edge 18 of the device mounting surface 14 for retaining the portable electronics device therein.

While the preferred and additional alternative embodiments of the invention have been illustrated and described, it will be appreciated that various changes can be made therein without departing from the spirit and scope of the invention. Therefore, it will be appreciated that various changes can be made therein without departing from the spirit and scope of the invention. Accordingly, the inventor makes the following claims.

What is claimed is:

1. A molded laptop tray for vehicle applications, comprising:
    a frame member comprising a device bearing surface between spaced apart edges thereof, the frame member consisting of a molded material;
    a mounting structure for mounting the frame member in a vehicle;
    a jaw member interconnected to the frame member positioned adjacent to one of the edges of the frame member oriented substantially crosswise thereof;
    a clamp member interconnected to the frame member for motion relative to a different one of the spaced apart edges of the frame member along a first direction oriented substantially crosswise thereof; and
    a biasing mechanism coupled between the frame member and clamp member for urging a jaw portion of the clamp member for motion along the first direction, the biasing mechanism being reconfigurable between a first configuration for urging the jaw portion of the clamp member away from the jaw member interconnected to the frame member along a first heading substantially aligned with the first direction, and a second configuration for urging the jaw portion of the clamp member toward the jaw member interconnected to the frame member along a second heading substantially aligned with the first direction.

2. The tray of claim 1 wherein the frame member further comprises the jaw member molded as a unit therewith.

3. The tray of claim 2 wherein the frame member further comprises the clamp member molded therewith, the clamp member further consisting of a molded material.

4. The tray of claim 2 wherein one of the jaw member and the clamp member further consists of a resiliently flexible molded material.

5. The tray of claim 2 wherein the clamp member is further slidably interconnected to the frame member for motion relative to the jaw member thereof along the first direction, and the clamp member further consisting of a molded material.

6. The tray of claim 1 wherein the clamp member further comprises a sled portion consisting of a molded material, the sled portion being structured to slide relative to the frame member substantially along the first direction.

7. A molded laptop tray for vehicle applications, comprising:
    a molded frame member comprising a device mounting surface between opposing first and second edges spaced apart along a first direction, the frame member consisting of a molded material, and further being structured for being securely mounted in a vehicle with the device mounting surface having a generally upwardly orientation;
a jaw portion arranged adjacent to the first edge of the frame member;
a clamp member comprising a jaw portion extended substantially crosswise of the second edge of the frame member and being moveably interconnected thereto for motion substantially along the first direction thereof; and
a reconfigurable biasing mechanism coupled between the frame and clamp members, the reconfigurable biasing mechanism being reversible between a first configuration for resiliently urging the jaw portion of the clamp member away from the second edge of the frame member, and a second configuration for resiliently urging the jaw portion toward the second edge of the frame member.

8. The molded tray of claim 7 wherein the jaw portion arranged adjacent to the first edge of the frame member is further molded integrally therewith, and the jaw member consisting of a molded material.

9. The molded tray of claim 8 wherein the clamp member further comprises a resiliently flexible portion thereof interconnected to the second edge of the frame member, whereby the clamp member is further moveable substantially along the first direction by resilient flexion of the resiliently flexible portion thereof.

10. The molded tray of claim 7 wherein the clamp member further comprises a guide arranged substantially along the first direction adjacent to the device mounting surface of the frame member, and
an elongated sled portion having the jaw portion extended substantially crosswise thereof adjacent to a first end thereof, the sled portion being slidably interconnected to the guide of the frame member for motion substantially along the first direction thereof.

11. The molded tray of claim 10 wherein the sled portion of the clamp member further comprises a first reaction portion adjacent to the first end thereof, and a second reaction portion spaced away from the first reaction portion along the sled portion; and
the reconfigurable biasing mechanism further comprises:
an actuator movable between first and second positions relative to the guide mechanism, the first and second positions being spaced apart along the first direction between the first and second reaction portions, and
a compression spring member, the compression spring member being resiliently compressible between the movable actuator and the first reaction portion of the clamp member when the movable actuator is in the first position, and compressible between the movable actuator and the second reaction portion of the clamp member when the movable actuator is in the second position.

12. A molded laptop tray for vehicle applications, comprising:
a frame member consisting of a molded material, the frame member being molded with a device mounting surface between opposing first and second edges spaced apart along a first direction and means for being fixedly mounted in a vehicle with the device mounting surface having a generally upwardly orientation;
a jaw portion consisting of a molded material, the jaw portion being arranged adjacent to the first edge of the frame member;
a clamp member movable relative to the molded frame member;
means for moving the clamp member relative to the frame member substantially along the first direction thereof; and
a means for biasing the clamp member relative to the frame member, and further comprising means for reconfiguring the biasing means between a first configuration for urging a jaw portion of the clamp member along the first direction away from the second edge of the frame member, and a second configuration for urging a jaw portion of the clamp member along the first direction toward the second edge of the frame member.

13. The molded tray of claim 12 wherein the frame member further comprises the jaw portion molded as a single unit integral therewith.

14. The molded tray of claim 13 wherein the clamp member further comprises a resiliently flexible portion thereof that is resiliently flexible substantially along the first direction.

15. The molded tray of claim 13, further comprising means for guiding the clamp member relative to the frame member along the first direction thereof.

16. The molded tray of claim 15 wherein the means for biasing the clamp member further comprises a resiliently compressible biasing member.

17. The molded tray of claim 16 wherein
the reconfigurable biasing mechanism further comprises:
first and second reaction means operable between the frame and clamp members, the resiliently compressible biasing member being positioned between first and second reaction means,
means for actuating the biasing member, the actuating means actuating the biasing member relative to the first reaction means in the first configuration, and the actuating means actuating the biasing member relative to the second reaction means in the second configuration, and
means for repositioning the actuating means between a first position between the first and second reaction means in the first configuration, and a different second position between the first and second reaction means in the second configuration.

* * * * *